US010203587B2

(12) United States Patent
Kim et al.

(10) Patent No.: US 10,203,587 B2
(45) Date of Patent: Feb. 12, 2019

(54) ELECTRONIC DEVICE AND METHOD FOR MANUFACTURING THE SAME

(71) Applicant: Samsung Electronics Co., Ltd., Gyeonggi-do (KR)

(72) Inventors: Sang-Hyeon Kim, Gyeongsangbuk-do (KR); Hee-Su Kim, Gyeongsangbuk-do (KR); Jang-Won Han, Gyeonggi-do (KR); Chang-Ho Kim, Daegu (KR)

(73) Assignee: Samsung Electronics Co., Ltd., Samsung-ro, Yeongton-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/607,948

(22) Filed: May 30, 2017

(65) Prior Publication Data

US 2017/0351164 A1  Dec. 7, 2017

(30) Foreign Application Priority Data

Jun. 1, 2016 (KR) .................. 10-2016-0068270

(51) Int. Cl.
| | |
|---|---|
| *G03B 17/08* | (2006.01) |
| *G03B 17/12* | (2006.01) |
| *G06F 1/16* | (2006.01) |
| *H04M 1/02* | (2006.01) |
| *H04N 5/225* | (2006.01) |

(52) U.S. Cl.
CPC ............ *G03B 17/08* (2013.01); *G03B 17/12* (2013.01); *G06F 1/1656* (2013.01); *H04M 1/0264* (2013.01); *H04N 5/2252* (2013.01); *H04N 5/2254* (2013.01); *H04N 5/2257* (2013.01); *G06F 1/1686* (2013.01)

(58) Field of Classification Search
USPC ....................................... 396/25, 29; 348/376
See application file for complete search history.

(56) References Cited

U.S. PATENT DOCUMENTS

| | | | | | |
|---|---|---|---|---|---|
| 4,383,743 | A | * | 5/1983 | Nozawa ................ | G03B 17/08 396/29 |
| 5,530,499 | A | * | 6/1996 | Mori ...................... | G03B 17/08 396/29 |
| 5,946,501 | A | * | 8/1999 | Hayakawa ............. | G03B 17/08 396/25 |
| 6,304,724 | B1 | * | 10/2001 | Ando ..................... | G03B 17/08 277/644 |

(Continued)

*Primary Examiner* — Clayton E Laballe
*Assistant Examiner* — Warren K Fenwick
(74) *Attorney, Agent, or Firm* — Cha & Reiter, LLC

(57) ABSTRACT

An electronic device according to the present disclosure may include: a housing including a substantially transparent plate that includes a first surface facing in a first direction, and a second surface facing in a second direction; a display exposed in the first direction; and a camera device exposed in the first direction. The camera device may include: a barrel structure including a side wall defining a space therein and an opening facing the first direction and a camera housing structure including a side portion surrounding at least a portion of the side wall of the barrel structure and an upper portion facing the first direction. The camera housing structure may include a first protrusion formed on the upper portion. The present disclosure implements a waterproof/ dustproof structure for capping at least a portion of the camera device.

18 Claims, 12 Drawing Sheets

(56) References Cited

U.S. PATENT DOCUMENTS

| | | | | |
|---|---|---|---|---|
| 8,342,325 | B2* | 1/2013 | Rayner | G06F 1/1626 |
| | | | | 206/305 |
| 8,532,475 | B2* | 9/2013 | Kim | G03B 17/02 |
| | | | | 359/513 |
| 9,099,856 | B2* | 8/2015 | Uttermann | H01R 13/516 |
| 2001/0009611 | A1* | 7/2001 | Akami | G03B 17/04 |
| | | | | 396/29 |
| 2007/0081804 | A1* | 4/2007 | Su | G03B 17/08 |
| | | | | 396/29 |
| 2009/0201413 | A1* | 8/2009 | Fishman | H04N 5/2252 |
| | | | | 348/373 |
| 2012/0063077 | A1 | 3/2012 | Tomobe et al. | |
| 2014/0347729 | A1* | 11/2014 | Park | G02B 7/10 |
| | | | | 359/511 |
| 2015/0189137 | A1* | 7/2015 | Han | B60R 11/04 |
| | | | | 348/374 |
| 2017/0285336 | A1* | 10/2017 | Kasuga | G02B 27/0006 |

\* cited by examiner

ELECTRONIC DEVICE AND METHOD FOR MANUFACTURING THE SAME

CLAIM OF PRIORITY

This application claims the priority under 35 U.S.C. § 119(a) from Korean Application Serial No. 10-2016-0068270, which was filed in the Korean Intellectual Property Office on Jun. 1, 2016, the entire content of which is hereby incorporated by reference.

TECHNICAL FIELD

The present disclosure relates to a waterproof/dustproof structure of a camera device mounted on an electronic device.

BACKGROUND

Recently, portable terminals (e.g., smart phones) with novel functions have been developing rapidly, and as the distribution of portable terminals has increases, they have come to play an increasingly important role in people's lives. Typically, these portable terminals have includes optical modules such as cameras. Both front-facing and rear-facing cameras are common in these portable terminals.

Further, as users' needs for portable terminals have gradually diversified, the portable terminals may include waterproof structures around the camera devices in order to prevent external liquids from infiltrating into the interior of the portable terminals and the camera device.

In the related art, waterproof structures of camera lenses may be formed by placing a piece of waterproof tape around a camera hole. In order to secure the waterproof tape within the portable terminal, a mounting space is required for the waterproof tape.

SUMMARY

Therefore, the existing designing type described above imposes limits on using the available space inside the portable device. Further, waterproof tape may be unreliable when the adhesiveness of the tape wears off The present disclosure provides a waterproof/dustproof structure of a camera device that protects the camera device from liquids as well as external impacts. The disclosed structure also may simplify existing mounting structures for waterproof cameras because mounter spaces for waterproof tape is not required.

According to one embodiment of the present disclosure, an electronic device may include: a housing including a substantially transparent plate that includes a first surface facing in a first direction, and a second surface facing in a second direction opposite from the first direction; a display exposed in the first direction through a first part of the plate; and a camera device exposed in the first direction through a second part of the plate.

The camera device may include: a barrel structure including a side wall defining a space therein and an opening facing the first direction; one or more lenses positioned in the space in the barrel structure; an image sensor positioned such that the one or more lenses are positioned between the opening and the image sensor; and a camera housing structure including a side portion surrounding at least a portion of the side wall of the barrel structure and an upper portion facing the first direction.

The camera housing structure may include a first protrusion formed on the upper portion.

According to an embodiment of the present disclosure, there is provided a camera housing structure disposed in an electronic device adapted to receive at least a portion of a barrel structure of a camera device. The camera housing structure may include: a first hole positioned at one end of the camera housing structure and having a first size; a second hole positioned at the other end of the camera housing structure and having a size larger than the first size; at least one first annular protrusion protruding from a front end of the camera housing structure toward a first direction; and at least one second annular protrusion protruding from a middle portion of the camera housing structure in a third direction, which is different from the first direction.

According to an embodiment of the present disclosure, there is provided a method of manufacturing an electronic device. The method may include: inserting at least a portion of a barrel structure of a camera device into a camera housing structure; seating the barrel structure, which is inserted into the camera housing structure on a seating portion of a part that extends from a bezel of the electronic device; and fixing a support member to a fixing portion of the part, so that when the support member is fixed to the fixing portion, the support member compresses a rear face of the seated barrel structure.

According to an embodiment of the present disclosure, it is possible to implement a waterproof/dustproof structure for a camera device, so that a waterproof/dustproof performance can be maximized at a low material cost and with a simple structure.

According to an embodiment of the present disclosure, the restriction of a mounting space inside an electronic device for waterproofing a camera device can be minimized, and the performance of the electronic device can be maximized because additional components and/or a large camera with a higher pixel value may be placed within the electronic device.

According to an embodiment of the present disclosure, it is possible to minimize the foot print of the electronic device, thereby implementing a product having a more pleasing design.

According to one embodiment of the present disclosure, it is possible to minimize the metal support in the electronic device, thereby reducing the deterioration of RF performance.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
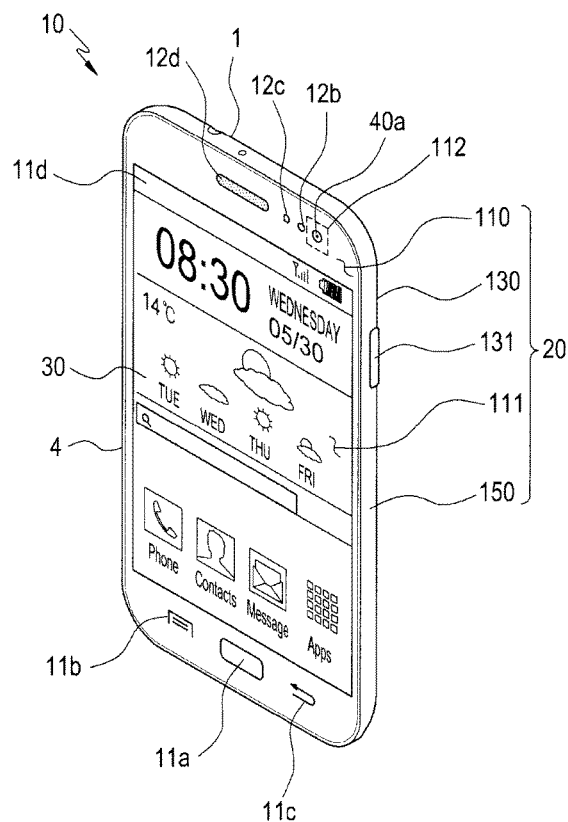
FIG. 1 is a perspective view illustrating the front face of an electronic device that is provided with a camera waterproof structure according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have," "may have," "include," or "may include" refers to the existence of a corresponding feature (e.g., numeral, function, operation, or constituent element such as component), and does not exclude one or more additional features.

In the present disclosure, the expression "A or B," "at least one of A or/and B," or "one or more of A or/and B" may include all possible combinations of the items listed. For example, the expression "A or B," "at least one of A and B," or "at least one of A or B" refers to all of (1) including at least one A, (2) including at least one B, or (3) including all of at least one A and at least one B.

The expression "a first," "a second," "the first," or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for," "having the capacity to," "designed to," "adapted to," "made to," or "capable of" according to the situation. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head- Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

Figure 2:
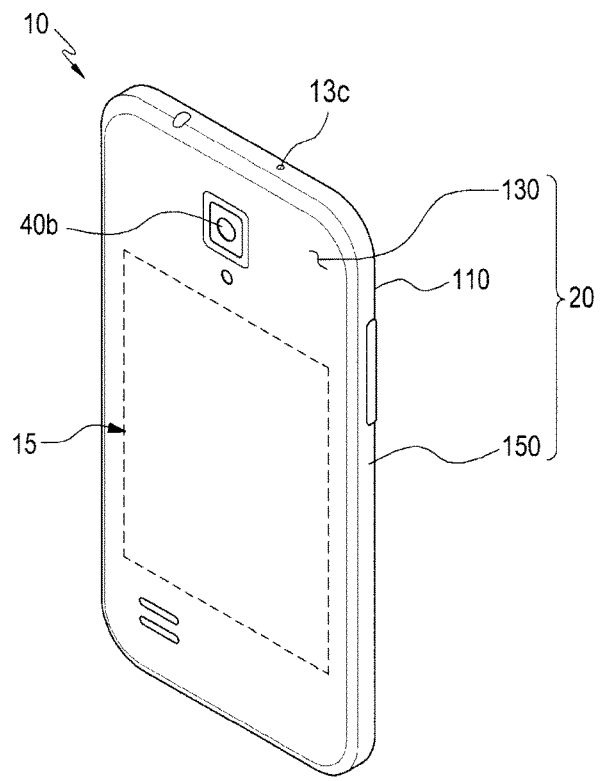
FIG. 2 is a perspective view illustrating the rear face of the electronic device that is provided with a camera waterproof structure according to the embodiment of the present disclosure.

FIG. 1 is a perspective view illustrating the front face of an electronic device. FIG. 2 is a perspective view illustrating the rear face of the electronic device. The electronic device 10 may be a smart phone or a wearable device. Components of an electronic device, such as a smart phone, will be described with reference to FIGS. 1 and 2.

As illustrated in FIG. 1, the electronic device 10 may include a display 30 that is disposed on the center or a first part of the front face of the electronic device 10. For example, the display 30 may be a touch screen that is equipped with a touch panel. The display 30 may occupy a majority portion of the front face of the electronic device 10. FIG. 1 illustrates an example in which a main home screen is displayed on the display 30. The main home screen refers to the first screen that is displayed on the display 30 when the power of the electronic device 10 is turned on. In addition, when the electronic device 10 may have several pages of different home screens, the main home screen may be the first home screen among the several pages of home screens. The home screen may display shortcut icons to execute frequently used applications, a main menu switching key, the time, the weather, or the like. The main menu switching key may cause a menu screen to be displayed on the display 30. In addition, in the upper end of the display 30, status bars 11*d* may be formed to indicate the statuses, such as a battery charge status, the intensity of a received mobile signal, the current time, etc. Below the display 30, a home key 11*a*, a menu button 11*b*, and a back button 11*c* may be present.

The home key 11*a* may cause the main home screen to be displayed on the display 30. For example, when the home key 11*a* is touched in the state in which any home screen, which is different from the main home screen, or the menu screen is displayed on the display 30, the main home screen may be displayed on the display 30. In addition, when the home key 11*a* is touched while applications are being executed on the display 30, the main home screen may be displayed on the display 30. In addition, the home key 11*a* may also be used for causing the most recently used application or a task manager to be displayed on the display 30. The menu button 11*b* may provide a connection menu that is capable of being used on the display 30. The connection menu may include, for example, a widget addition menu, a background screen change menu, a retrieval menu, an editing menu, or an environment setting menu. The back button 11*c* may cause the screen, which has been executed just prior to the currently executed screen, to be displayed, or may cause the most recently used application to be terminated.

According to one or more embodiments of the present disclosure, as illustrated in FIG. 1 described above, a first camera 40*a*, an illuminance sensor 12*b*, or a proximity sensor 12*c* may be included in the upper end region or a second part of the front face of the electronic device 10.

As illustrated in FIG. 2, a second camera 40*b*, a flash, or a speaker 13*c* may be arranged on the rear face of the electronic device 10. When the electronic device 10 is configured such that a battery pack is detachably mounted thereon, the rear face of the electronic device 10 may include a detachable battery cover 15.

In addition, a camera device (camera lens module) 40 (shown in FIG. 5) in the electronic device 10 is a device that is capable of capturing, for example, a still image and a video image, and may include at least one image sensor (e.g., a front sensor or a rear sensor), a lens, an Image Signal Processor (ISP), or a flash (e.g., an LED or a xenon lamp). As shown in FIGS. 1 and 2, both cameras 40*a* and 40*b* may be implemented with the camera device 40.

In the present embodiment, the camera device 40 described above is described with reference to the front camera 40*a* of the electronic device disclosed herein by way of example, but the present embodiment is not limited thereto. The camera device 40 is variously applicable to any camera, such as a second camera 40*b* disposed in the rear face of the electronic device, in addition to a first camera disposed in the upper end region of the front face of the above-described electronic device. In the present embodiment, descriptions will be made with reference to a front camera device that is provided with a waterproof feature.

In the following, a configuration according to the waterproof structure of the camera device 40 provided in the electronic device 10 according to one or more embodiments of the present disclosure will be described in detail.

Figure 3:
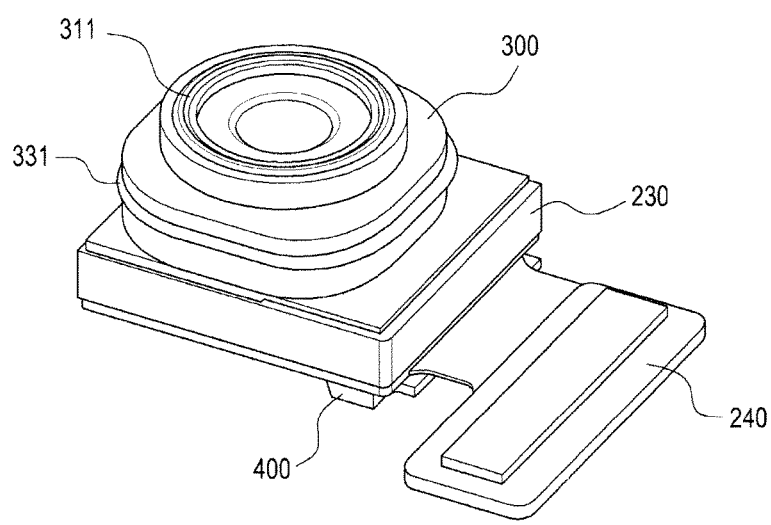
FIG. 3 is a perspective view illustrating a camera waterproof structure according to an embodiment of the present disclosure.

FIG. 3 is a perspective view illustrating a camera waterproof structure according to an embodiment of the present disclosure.

As illustrated in FIGS. 1 to 3, the electronic device 10 of the present disclosure may include a housing 20, a display 30, and a camera device 40.

Figure 6:
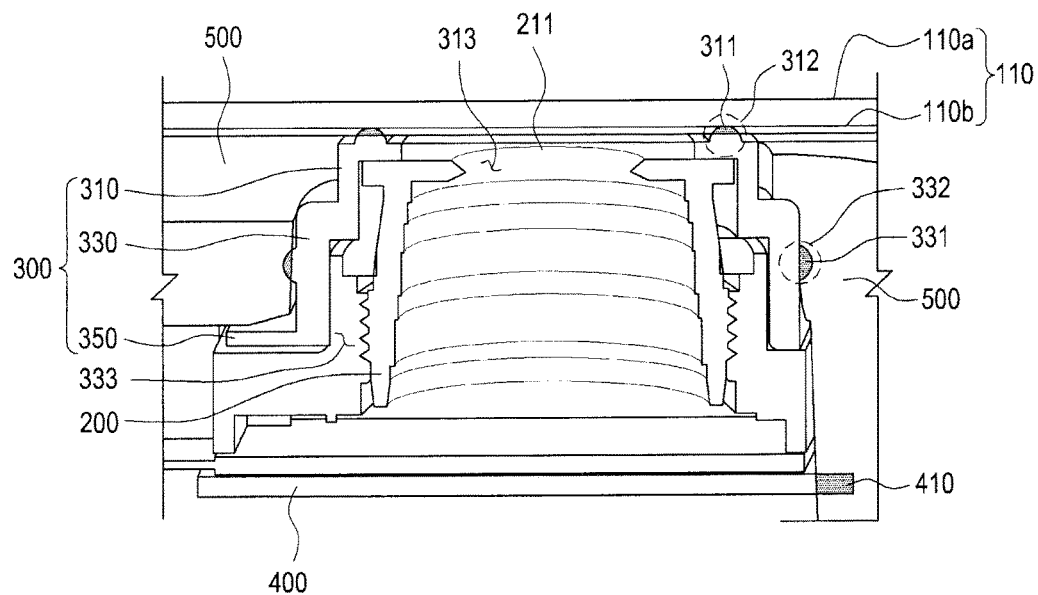
FIG. 6 is a cross-sectional view illustrating waterproof contact faces of a camera housing structure inside an electronic device according to an embodiment of the present disclosure.

According to an embodiment of the present disclosure, the housing 20 may include a first plate 110 disposed to face the front direction, and a second plate 130 disposed to face the rear direction, which is the direction opposite the front direction. The first plate 110 may be a transparent plate. According to an example, the transparent first plate 110 may include a first surface 110a (as shown in FIG. 6) that faces a first direction and a second surface 110b that faces a second direction, which is the direction opposite the first direction. For example, the first surface 110a may be a surface exposed to the exterior of the electronic device 10, and the second surface 110b may be a surface that faces the inside of the electronic device 10. For example, the first direction may be towards the exterior of the electronic device 10, and the second direction may be towards the interior of the electronic device 10. According to an embodiment of the present disclosure, the transparent first plate 110 may be glass disposed on the LCD module in which, for example, the first surface may include the upper surface of the glass, and the second surface may include the lower surface of the glass.

In addition, according to one embodiment, the housing 20 may include a bezel 150 that is disposed between the first plate 110 and the second plate 130.

According to an embodiment of the present disclosure, the first plate 110 may form the front cover of the electronic device 10, and the second plate 130 may form the rear cover of the electronic device 10. In addition, the bezel 150 may be configured to enclose at least a portion of a space formed between the first plate 110 and the second plate 130.

According to one or more embodiments of the present disclosure, the first plate 110 and the second plate 130 may be formed in a flexible shape in which a curved portion is partially included, as well as being formed in a flat plate shape. In addition, the outer face of the bezel 150 may also be formed in a shape that includes a curved portion in such that a user may easily wrap and grip the electronic device 10 in one hand. Accordingly, when physical button 131 is disposed on the side of the electronic device 10, the user may easily click the button 131 when gripping the electronic device 10.

According to an embodiment of the present disclosure, the bezel 150 is disposed between the first plate 110 and the second plate 130, and may form a space in which inner electronic components are mountable while also forming the outer face of the housing 20. For example, the bezel 150 may include a third part 500 (shown for example in FIG. 6) on which at least a portion of a camera device 40 or a camera housing structure 300 may be seated.

According to an embodiment of the present disclosure, the display 30 may be exposed in the first direction through a first part 111 of the first plate 110. The first part 111 may be constituted with a transparent plate so as to allow a user to visually recognize the display 30. The display 30 may be a touch screen.

According to an embodiment of the present disclosure, the camera device 40 (which may be camera 40a) is disposed on a second part of the front face of the above-described electronic device 10. In an embodiment of the present disclosure, the camera device 40 (shown in FIG. 4) is disposed in the space formed between the first plate 110 and the second plate 130 and may be configured such that the lens 211 (shown in FIG. 4) of the camera device 40 is exposed through an opening that is disposed in a region other than the display corresponding to the first part 111 of the first surface 110a (e.g., the second part 112).

According to an embodiment of the present disclosure, the camera device 40 may include a barrel structure 200, at least one lens 211, a camera housing structure 300, and a support member 400.

Figure 4:
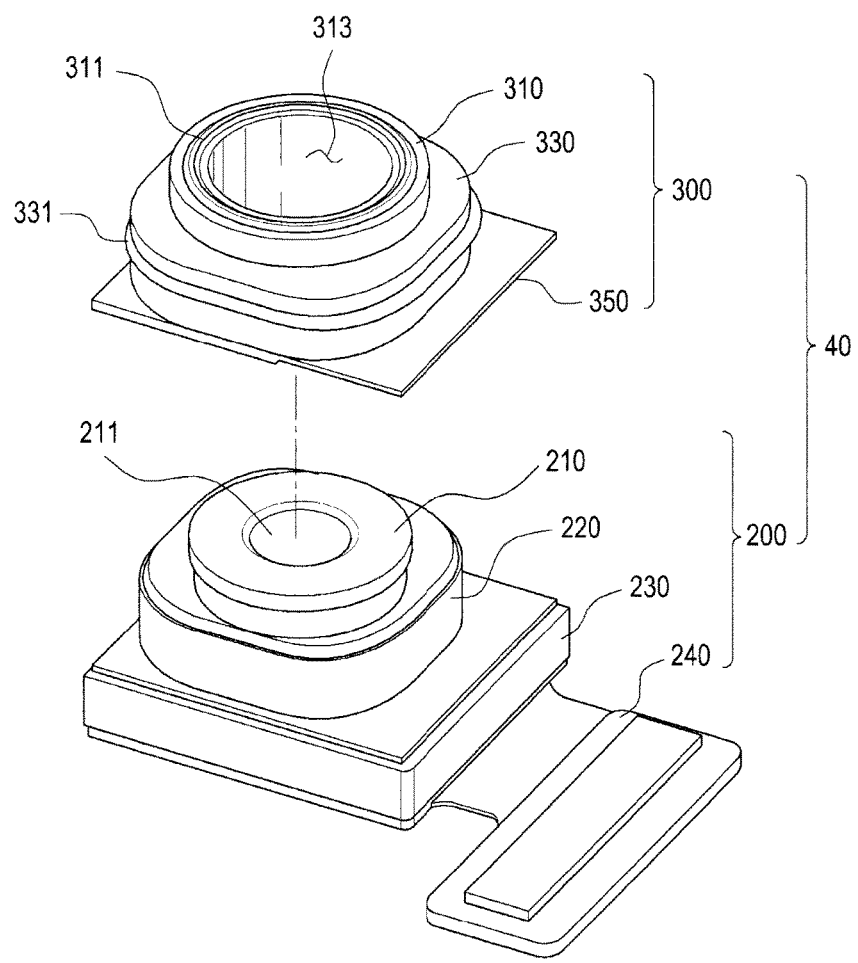
FIG. 4 is a perspective view illustrating a process of coupling a barrel structure and a camera housing structure to each other according to an embodiment of the present disclosure.

The barrel structure 200 may include a lens barrel 210, a filter barrel 220, an image sensor 230, and a printed circuit board 240 (see FIG. 4).

The camera housing structure 300 may be arranged such that at least a portion of the camera device 40 is inserted therein, and holes 313 and 333 (see FIG. 6) having different sizes may be provided in the opposite ends of the camera housing structure 300. The camera housing structure 300 may be configured to enclose the camera device 40 so as to shield the camera device 40 from external foreign matter, including dust and liquids, and protect the camera device 40 from external physical impact.

The support member 400 may be disposed to be in contact with the lower portion of the camera device 40 so as to support the camera device 40, as shown in FIG. 4. Hereinafter, the detailed configuration of the electronic device 10 in which the camera device 40 is seated and waterproofed/dustproofed will be described in detail with reference to additional drawings.

FIG. 4 is a perspective view illustrating a process of coupling a barrel structure and a camera housing structure to each other according to an embodiment of the present disclosure.

Referring to FIG. 4, the barrel structure 200 of the electronic device 10 according to an embodiment of the present disclosure may be coupled with the camera housing structure 300 having a shape corresponding to the shape of the front end portion and/or the middle portion of the barrel structure 200 in order to protect the barrel structure 200 from foreign matter such as liquids.

According to an embodiment of the present disclosure, the barrel structure 200 may be implemented to include a sidewall that defines a space therein and an opening directed in the first direction.

According to an embodiment, the barrel structure 200 may include a lens barrel 210 that constitutes the front end portion, a filter barrel 220 that constitutes the intermediate portion, an image sensor 230 that constitutes the rear end portion, and a printed circuit board 240.

At least one optical lens 211 may be provided in the inner space in the lens barrel 210. In the present embodiment, at least one pair of optical lenses 211 may be positioned to be aligned on the optical axis of the image sensor 230.

The filter barrel 220 may be disposed between the image sensor 230 and the lens barrel 210. The filter barrel 220 may include an infrared filter.

The image sensor 230 may be mounted on one side of the printed circuit board 240 by, for example, a flip-chip bonding technique. The optical axis of the image sensor 230 may be aligned with those of the optical lenses 211.

The printed circuit board 240 may be a flexible printed circuit board. According to an embodiment of the present disclosure, the camera device 40 may be a COF type camera device.

In addition, the printed circuit board 240 may include conductive routes connected to at least some of the plurality of conductive lines of the camera device 40. For example, the printed circuit board 240 may be formed with a plurality of contact points at the lower portion thereof so that the conductive routes electrically connect the image sensor 230 to another printed circuit board of the electronic device 10.

According to an embodiment of the present disclosure, the barrel structure 200 may include any of various types of camera modules that are inserted into the electronic device 10 so as to be capable of capturing images and processing data.

According to an embodiment of the present disclosure, the camera housing structure 300 is configured to wrap a part of the barrel structure 200, and may include a hole 333 into which the barrel structure 200 can be inserted and another hole 313 through which the lens 211 can be exposed to the exterior of the electronic device.

The camera housing structure 300 is configured to cap the barrel structure 200. Specifically, the camera housing structure 300 is formed to elastically wrap the periphery of a portion of the exterior of the barrel structure 200 so as to block the penetration of fluid into the barrel structure 200 and the inside of the camera device 40.

According to an embodiment of the present disclosure, the camera housing structure 300 may include a lens waterproof region 310 configured to enclose the lens barrel 210 of the barrel structure 200 and a filter waterproof region 330 configured to enclose the filter barrel 220 of the barrel structure 200.

According to an embodiment of the present disclosure, the lens waterproof region 310 may be made of an elastic material (e.g., rubber) and may serve to protect the camera lens 211 from an external impact and to primarily block the penetration of fluids into the inside of the electronic device 10.

In addition, the filter waterproof region 330 may be made of an elastic material (e.g., rubber) and may serve to protect the filter barrel 220 from an external impact and to secondarily and tertiarily block the penetration of fluids into the inside of the electronic device 10.

According to an embodiment of the present disclosure, the lens waterproof region 310 and the filter waterproof region 330 may include one or more holes 313 and 333 and protrusions 311 and 331 (see FIG. 6).

A first hole 313 disposed on one side of the lens waterproof region 310 is exposed to the exterior of the electronic device 10 to allow the camera lens 211 to be exposed to the outside of the camera lens 211. And at least one first annular (e.g. ring-shaped) protrusion 311 protruding toward the first direction may be disposed around the first hole 313.

A second hole 333 disposed on one side of the filter waterproof region 330 provides a passage into which the camera device 40 can be inserted, and may be formed to have a relatively larger size than that of the first hole 313. For example, since the filter barrel 220 is configured to have a relatively larger size than the lens barrel 210, the circumferential size of the filter waterproof region 330 may be formed to be larger than that of the lens waterproof region 310. Accordingly, the second hole 333 may have a circumferential size equal to or greater than that of the filter waterproof region 330. On the outer face of the filter waterproof region 330, at least one second annular protrusion 331 may be disposed to protrude toward a third direction, which is different from the first direction and/or the second direction. As shown in FIG. 6, the first the second directions may be vertical, while the third direction may be horizontal.

According to an embodiment of the present disclosure, the first direction which the first annular protrusion 311 faces and the third direction which the second annular protrusion 331 faces are perpendicular to each other, and the first and second annular protrusions 311 and 331 may form waterproof contact faces 312 and 332 in different directions so as to effectively block the penetration of liquids from the outside.

According to an embodiment of the present disclosure, the lower end of the camera housing structure 300 may further include a step portion 350 arranged to come into contact with a portion of the image sensor 230. The step portion 350 is formed to face the second direction and inserted into a groove disposed in the electronic device 10 to fix the camera housing structure 300 to the inside of the electronic device 10. In addition, the step portion 350 may be made of an elastic material (e.g., rubber), and may serve to protect the image sensor 230 from an external impact and to block the penetration of fluids into the inside of the electronic device 10.

Figure 5:
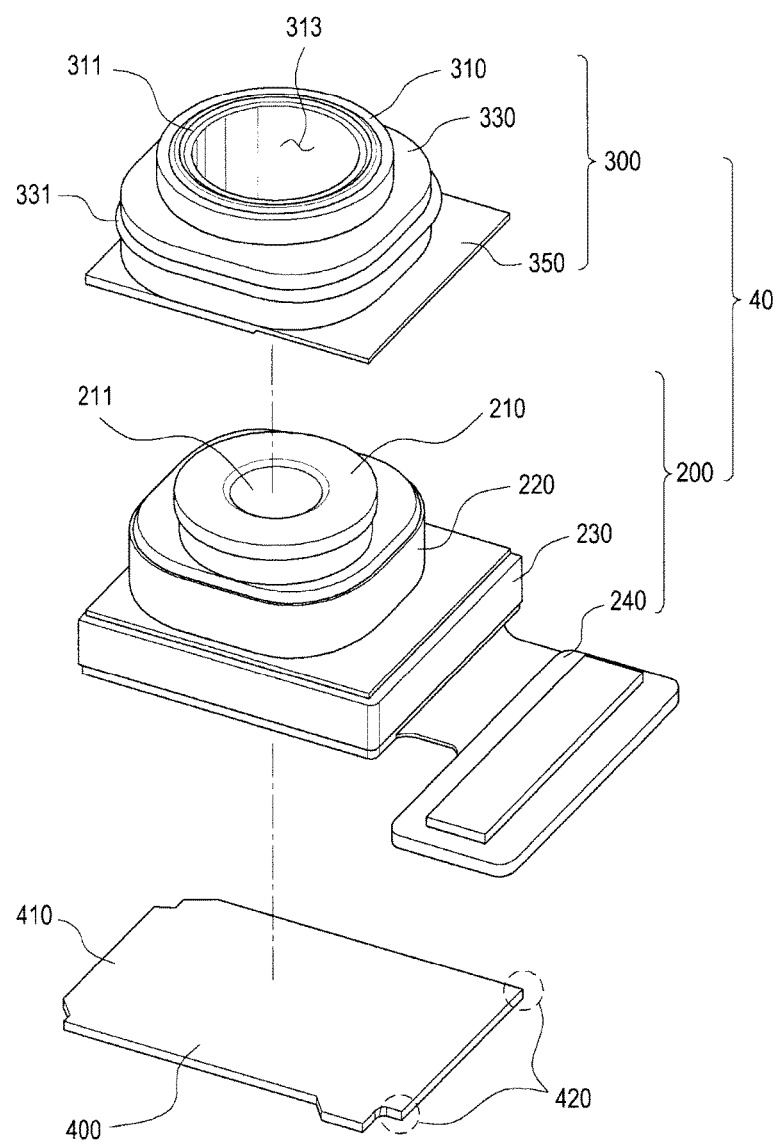
FIG. 5 is a perspective view illustrating a process of coupling the camera housing structure to the front portion of the barrel structure and coupling a support member to the rear portion of a camera device according to an embodiment of the present disclosure.

FIG. 5 is a perspective view illustrating a process of coupling the camera housing structure to the front portion of the barrel structure and coupling a support member to the rear portion of a camera device according to an embodiment of the present disclosure.

Referring to FIG. 5, in addition to coupling the camera housing structure 300 having a shape corresponding to at least a portion of the barrel structure 200 in order to protect the camera device 40 from foreign matter, a support member 400 may be disposed on the rear or bottom face of the barrel structure 200.

According to an embodiment of the present disclosure, the support member 400 may be arranged to face the printed circuit board 240 of the camera device 40, and may be configured to have a shape corresponding to a portion of the printed circuit board 240.

In addition, according to an embodiment of the present disclosure, the support member 400 may be formed in a plate shape with an SUS material, and may be fixedly coupled to the third part 500 the bezel such that the camera housing structure 300 is compressed.

The support member 400 may include at least one protrusion 410 and flat corner portions 420 for coupling to the electronic device 10.

The protrusion 410 and the corner portions 420 may be provided in the opposite regions, respectively, so that all the faces of the support member 400 can be pressed and supported. For example, after the protrusion 410 is inserted and fixed in a portion of the electronic device 10, the corner portions 420 may be fixed to other portions of the electronic device 10.

FIG. 6 is a cross-sectional view illustrating waterproof contact faces of a camera housing structure inside an electronic device according to an embodiment of the present disclosure.

Referring to FIG. 6, the camera housing structure 300 of the electronic device 10 may form one or more waterproof contact faces 312 and 332 that are capable of preventing foreign matter, such as a liquid, from entering the interior of the camera 40 while being in contact with the third part 500.

According to an embodiment of the present disclosure, the first annular protrusion 311 protruding in the first direction of the camera housing structure 300 may have a first waterproof contact face 312 that is formed by coming in contact with one face of the third part 500 or with the second surface 110b, and the second annular protrusion 331 protruding in the third direction may have a second waterproof contact face 332 that is formed by coming in contact with another face of the third part 500.

According to an embodiment of the present disclosure, the first waterproof contact face 312 may be formed when the surface the first annular protrusion 311 protruding in the first direction of the electronic device 10 and the inside of the electronic device 10 (for example, one face of the third part 500 or the second surface 110b) come into elastic contact with each other. The surface of first annular protrusion 311 may be a grooved surface. For example, when a surface of the third part 500 or the second surface 110b and the first annular protrusion 311 are brought into direct contact with and compressed against each other, overlap may be caused and a watertight seal may be formed.

The second waterproof contact face 332 may be formed when the second annular protrusion 331 protruding in the third direction, for example, toward a direction perpendicular to the first direction, and the inside of the electronic device 10 come into elastic contact with each other. For example, when the second annular protrusion 331 comes in direct contact with a surface of the third part 500, overlap may be caused and a watertight seal may be formed.

An embodiment of the present disclosure discloses the first annular protrusion 311 and the second annular protrusion 331. However, the present disclosure is not limited to this, and the first and second protrusions may be formed in various other closed curve shapes.

In addition, according to an embodiment of the present disclosure, the camera housing structure 300 constitutes one first waterproof contact face due to the first annular protrusion 311, and one second waterproof contact face 332 due to the second annular protrusion 331. However, without being limited thereto, a plurality of protrusions may be additionally disposed on each of the lens waterproof region 310 and the filter waterproof region 330 of the camera housing structure 300 so as to form additional waterproof contact faces.

According to an embodiment of the present disclosure, it can be seen that as the support member 400 compresses the camera housing structure 300 from the bottom to the top, the camera device 40 inserted into the camera housing structure 300 can be fixedly inserted into the third part 500, so that the detachment of the camera device 40 to the outside can be prevented.

In order to implement the waterproof structure in the related art, a space is required for disposing the waterproof tape on the upper end region of the display of the electronic device, and a mounting space is required for coating of side bonding and mounting an O-ring around the camera device. This causes problems in miniaturization of the electronic device.

Meanwhile, in the case of the present disclosure, by implementing only one waterproof structure wrapping the barrel structure 200, the waterproof performance can be secured easily, and the region where the waterproof tape is mounted can be removed, thereby maximizing the utilization of spaces within the electronic device 10.

Figure 7:
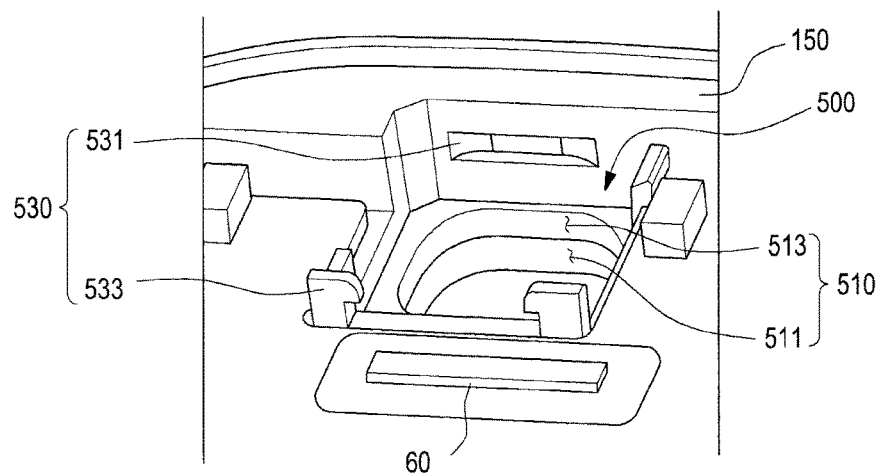
FIG. 7 is a perspective view illustrating a structure of a part of an electronic device according to an embodiment of the present disclosure.

FIG. 7 is a perspective view illustrating a structure of the third part 500 of an electronic device according to an embodiment of the present disclosure.

Referring to FIG. 7, the third part 500 may be disposed behind the second part 112 of the first plate 110. In addition, the third part 500 extends from the bezel 150 of the electronic device 10 and may include at least one seating portion so that the camera device 40, the camera housing structure 300, and the support member 400 can be inserted.

According to an embodiment of the present disclosure, the third part 500 may be disposed between the first plate 110 and the second plate 130 of the electronic device 10 (see FIG. 2), and may be configured to come into contact with the second part 112 of the first plate 110. The seating portion in the third part 500 may include at least one seating portion 510 on which the camera housing structure 300 or the bezel 200 is seated and supported. The third part 500 may also include at least one fixing portion 530 configured to fix the support member 400.

According to an embodiment of the present disclosure, the seating portion 510 may include a first seating portion 511, on which the lens barrel 210 enclosed by the front end portion of the camera housing structure 300 and/or the filter barrel 220 enclosed by the middle portion of the camera housing structure 300 are seated, and which forms the first waterproof contact face 312 and the second waterproof contact face 332 with the first annular protrusion 311 and the second annular protrusion 331.

According to an embodiment of the present disclosure, the seating portion 510 may include a second seating portion 513 on which the image sensor 230, the printed circuit board 240, which correspond to the rear end portion of the camera device 40, are partially seated.

According to an exemplary embodiment of the present disclosure, the first seating portion 511 may be configured as a stepped groove including a step to correspond to the shape of the camera housing structure 300, and a portion of the face that comes into contact with the second part 112 may be provided in an opened form such that the lens 211 of the camera device 40 is exposed to the exterior.

According to an embodiment of the present disclosure, the first waterproof contact face 312 may be formed when the first annular protrusion 311 comes in elastic contact with one face of the first seating portion 511 of the third part 500 or the first plate 110. In addition, the second waterproof contact face 332 may be formed when the second annular protrusion 331 comes in elastic contact with the second seating portion 513 of the third part 500.

According to an embodiment of the present disclosure, the first seating portion 511 or the second seating portion 513 is configured in the form of a groove having a closed curve shape with open top and bottom sides. Without being limited thereto, however, the first seating portion 511 or the second seating portion 513 may be configured in various forms that correspond to the shape of the camera housing structure 300 or the camera device 40.

According to an embodiment of the present disclosure, the fixing portion 530 is formed inside the electronic device 10 and may be configured with at least one groove or step such that at least a portion of the support member 400 can be inserted into the fixing portion 530.

According to an embodiment of the present disclosure, the fixing portion 530 may include a first fixing portion 531 and a second fixing portion 533. The first fixing portion 531 may be formed to have a groove in the inside of the bezel 150 so that the protrusion 410 of the support member 400 can be inserted into the groove, thereby preventing the detachment of the camera housing structure 300 or the camera device 40. The first fixing portion 531 may be designed to correspond to the shape of the protrusion 410 of the support member 400. The shape of the protrusion 410 may be designed to have a curved rounded shape in order to prevent abrasion due to friction of the corners upon being inserted into the first fixing portion 531, and to correspond to this, the corners of the first fixing portion 531 may be designed to have a curved rounded shape also.

The second fixing portion 533 may be disposed opposite the first fixing portion 531 and may fix the corner portions 420 disposed opposite of the protrusion 410 of the supporting member 400 so that the detachment of the camera housing structure 300 or the camera device 40 can be prevented. There may be provided a plurality of second fixing portions 533 for each corner of the support member 400.

According to an embodiment of the present disclosure, the second fixing portions 533 are configured in a stepped shape such that one side of the support member 400 can be fitted thereto. Without being limited thereto, however, the second fixing portions 533 may be implemented in various shapes suitable for their intended purpose.

According to an embodiment of the present disclosure, the third part 500 may be manufactured by a front insert injection molding method, and, after being injection-molded, processing four corners by a 4-π T-cut. In addition, when the support member 400 is coupled to the first fixing portion 531 and the second fixing portion 533, they can be assembled by compressing the support member 400 with about 0.25 t STS of pressure.

In a conventional electronic device, a support member is used to suppress the movement of the camera device or the like, in addition to a separate fixing member for fixing the support member. This acts as a main cause of deterioration of RF performance. In addition, this conventional design takes up considerable space inside the electronic device.

In contrast, in the present disclosure, since the support member 400 cooperates with the third part 500 so as to minimize the space occupied by the support member 400 and eliminate the need for a separate fixing element, RF performance is improved.

Figure 8:
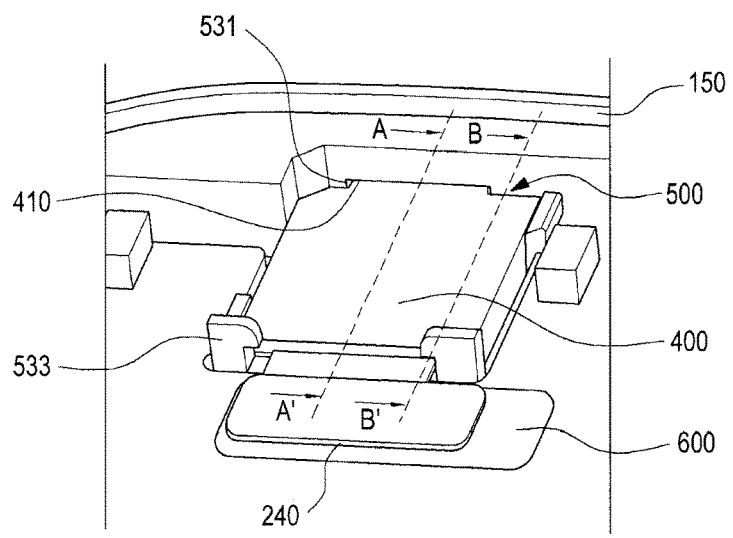
FIG. 8 is a perspective view illustrating a state in which a camera housing structure, a barrel, and a support member are coupled into a part of an electronic device according to an embodiment of the present disclosure.

FIG. 8 is a perspective view illustrating a state in which the camera housing structure, the barrel, and the support member are coupled into the third part of the electronic device according to an embodiment of the present disclosure.

Referring to FIG. 8, the camera housing structure 300 and the barrel structure 200 are seated on the seating portion 510 of the third part 500, and the support member 400 may be seated on the rear side thereof. The support member 400 may be fixedly fitted to the second fixing portions 533 by pressing the opposite side of the protrusion 410 of the support member 400 after the support member 400 is inserted into the first fixing portion 531. The coupling state of the support member 400 can be confirmed in detail through the cross-sectional view of FIG. 8.

Figures 9, 10:
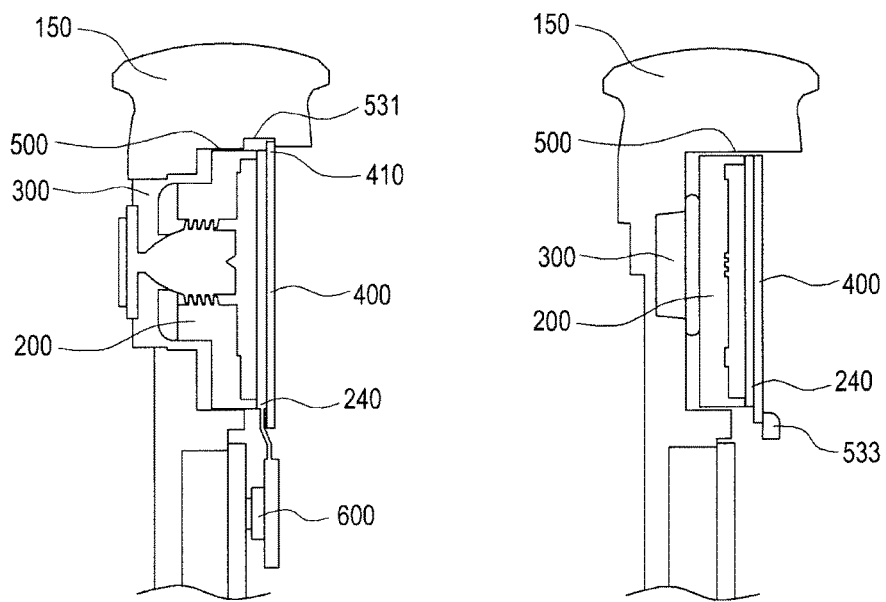
FIG. 9 is a cross-sectional view taken in direction A-A' in FIG. 8 and illustrating a state in which the part, the camera housing structure, the barrel, and the supporting member are coupled.
FIG. 10 is a cross-sectional view taken in direction B-B' in FIG. 8 and illustrating a state in which the part, the barrel, the camera device, and the supporting member are coupled.

FIG. 9 is a cross-sectional view taken in direction A-A' in FIG. 8 and illustrating a state in which the third part, the camera housing structure, the barrel, and the supporting member are coupled.

Referring to FIG. 9, FIG. 9 is a sectional view obtained by viewing the center of the camera housing structure 300, the barrel structure 200, and the support member 400 from a side. The camera housing structure 300, the barrel structure 200, and the member 400 may be sequentially disposed from left to right.

According to an embodiment of the present disclosure, it can be confirmed that the lens of the camera device 40 is exposed to the outside through the opening in the third part 500 and the first hole 313 of the camera housing structure 300, thereby providing a path through which the user can capture an image of a subject.

According to an embodiment of the present disclosure, it is confirmed that the protrusion 410 of the support member 400 is inserted into the first fixing portion 531 of the third part 500 and as a result the detachment of the camera waterproof structure can be prevented. The printed circuit board 240 of the barrel structure 200 may extend into an opened space between the third part 500 and the support member 400 to come into contact with, and to be electrically connected to the connection portion 600 of the electronic device 10. Signals transmitted according to the capture of an image of the subject by the camera module can be transmitted as electrical signals via the printed circuit board 240 disposed under the barrel structure 200.

FIG. 10 is a cross-sectional view taken in direction B-B' in FIG. 8 and illustrating a state in which the third part, the barrel, the camera device, and the supporting member are coupled.

Referring to FIG. 10, FIG. 10 is a sectional view obtained by viewing the camera housing structure 300, the barrel structure 200, and the support member 400 from a predetermined distance apart from the center thereof in which the camera housing structure 300, the barrel structure 200, and the support member 400 may be disposed sequentially from left to right.

According to an embodiment of the present disclosure, it can be confirmed that the other face of the support member 400 is coupled to the second fixing portions 533 of the third part 500, thereby preventing the detachment of the camera waterproof structure.

Figure 11:
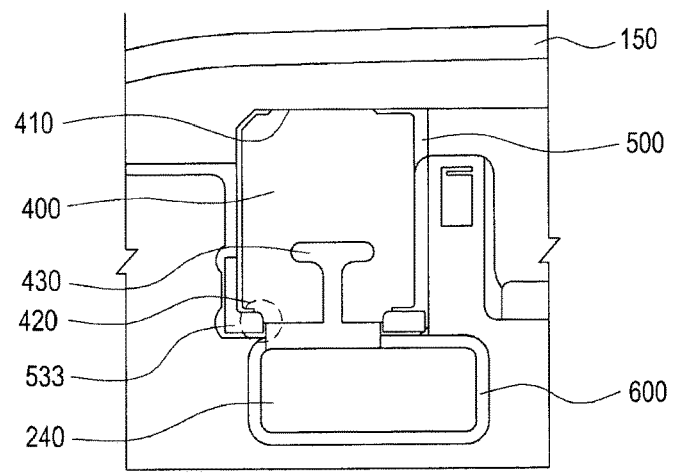
FIG. 11 is a top plan view illustrating the support member including an open slit according to an embodiment of the present disclosure.

FIG. 11 is a top plan view illustrating the support member including an open slit according to an embodiment of the present disclosure.

Referring to FIG. 11, the assemblability of the second fixing portion 533 of the third part 500 and the support member 400 can be improved by forming an open slit 430 on one face of the supporting member 400.

According to various embodiments of the present disclosure, an open slit 430 of a specific shape may be formed inwardly from an edge of the support member 400. The open slit 430 may have a "T" shape when viewed from the top, and may extend from the center of the support member 400 toward the opposite end of the protrusion 410. The opposite corner portions 420 may form two coupling regions, and the corner portions 420 may be coupled to the second fixing portions 533 of the third part 500, respectively. Due to the presence of the open slit 430, elastic deformation occurs in the support member 400 when placing the corner portions 420 to be received by the second fixing portions 533, and coupling between the support member 400 and the second fixing portions 533 can be more easily guided. Further, after the coupling and the elastic deformation, the open slit 430 can be restored to its original state, so that the tight coupling can be maintained.

Figure 12:
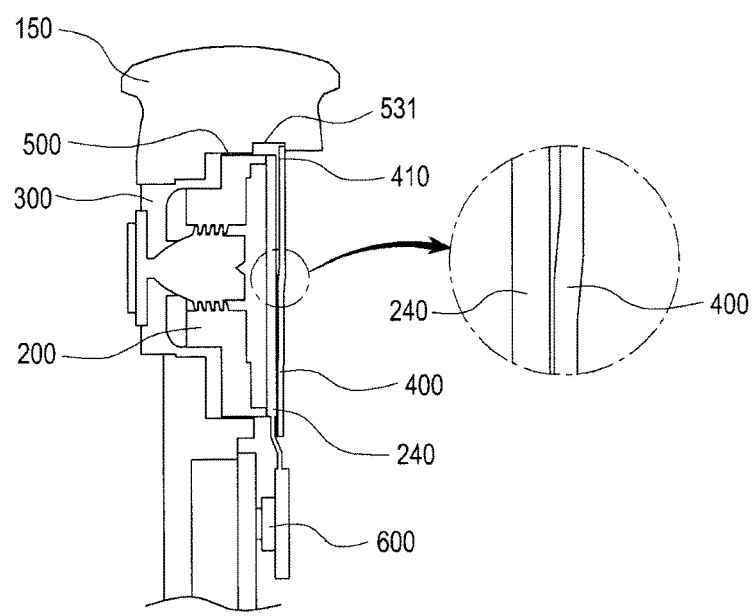
FIG. 12 is a side view illustrating a compressed support member according to an embodiment of the present disclosure.

FIG. 12 is a side view illustrating a compressed support member according to an embodiment of the present disclosure.

Referring to FIG. 12, the assemblability of the second fixing portion 530 of the third part 500 and the support member 400 can be improved by forming a specific portion of the support member 400 to be bent or of the support member 400 has variable thickness.

According to an embodiment of the present disclosure, the support member 400 may be designed such that a bent portion exists at a specific portion in addition to a flat plate-like structure, so that one end portion and the other end portion of the support member 400 are not co-linear to each other. Accordingly, when the support member 400 is coupled with the third part 500, a portion, which is more inwardly, exists, so that it is possible to further increase the force of inwardly compressing the camera device 40 or the camera housing structure 300 when the support member 400 is compressed. The compressing force can further enhance the adhesion between the camera housing structure 300 and the electronic device 10 and the adhesion between the camera housing structure 300 and the barrel structure 200, thereby maximizing the waterproof/dustproof effect of the present disclosure.

According to an embodiment of the present disclosure, the support member 400 may be designed such that a thicker portion exists at a specific portion in addition to a flat plate-like structure. Accordingly, when the support member 400 is coupled with the third part 500, a portion, (thicker portion) which is further inward, exists, so that it is possible to further increase the force of inwardly compressing the camera device 40 or the camera housing structure 300 when the support member 400 is compressed. The compressing force can further enhance the adhesion between the camera housing structure 300 and the electronic device 10 and the adhesion between the camera housing structure 300 and the camera device 40, thereby maximizing the waterproof/dustproof effect of the present disclosure.

Hereinafter, the process of manufacturing the camera waterproof structure of the electronic device 10 will be described in detail.

Figure 13:
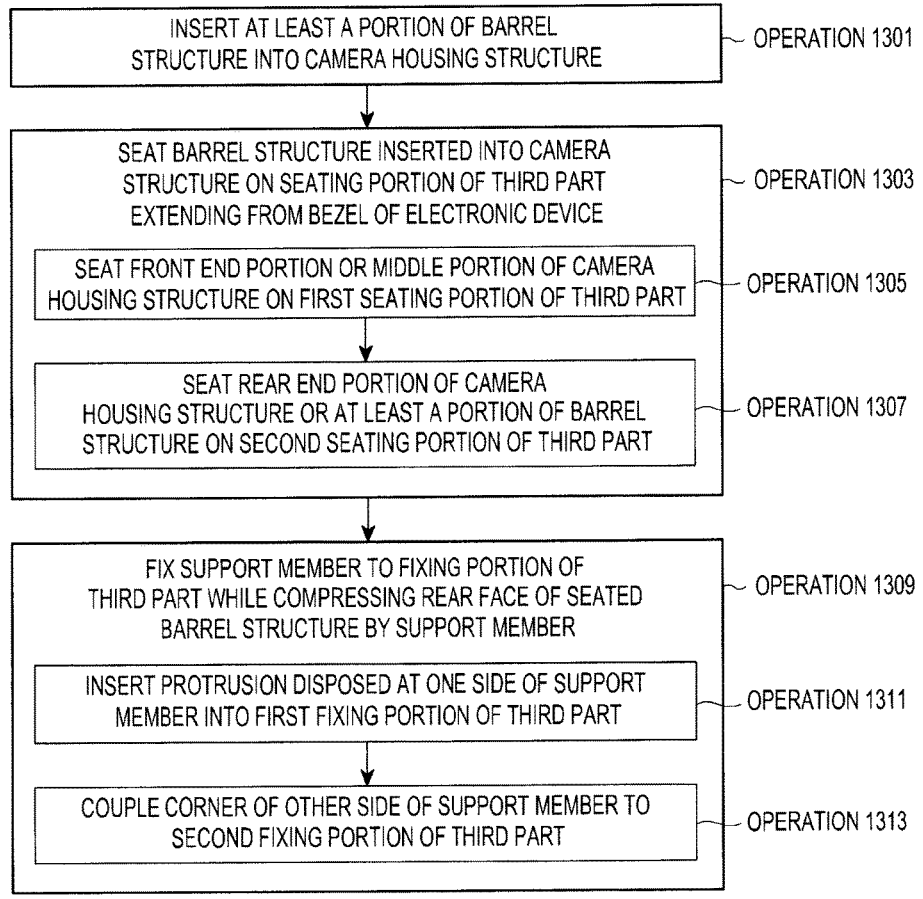
FIG. 13 is a flowchart illustrating a method of manufacturing an electronic device according to an embodiment of the present disclosure.

FIG. 13 is a flowchart illustrating a method of manufacturing an electronic device according to an embodiment of the present disclosure. According to an embodiment of the present disclosure, the camera device 40 may include a barrel structure 200, at least one lens 211, a camera housing structure 300, and a support member 400.

In operation 1301, the operation of inserting at least a portion of the barrel structure 200 into the camera housing structure 300 may be executed. According to an embodiment, the barrel structure 200 may include a lens barrel 210 that constitutes the front end portion, a filter barrel 220 that constitutes the intermediate portion, an image sensor 230 that constitutes the rear end portion, and a printed circuit board 240. Here, the lens barrel 210 and the filter barrel 220 of the barrel structure 200 may be inserted into the camera housing structure 300.

Accordingly, the camera housing structure 300 may be constituted with a lens waterproof region 310 configured to enclose the lens barrel 210 of the barrel structure 200 and a filter waterproof region 330 configured to enclose the filter barrel 220 of the barrel structure 200.

The camera housing structure 300 is configured in the form of capping the barrel structure 200. Specifically, the camera housing structure 300 is formed to elastically wrap a portion of the exterior of the camera device 40, for example, the periphery of the lens barrel 210 and the filter barrel 220 so as to block the permeation of matter into the barrel structure 200 and the inside of the electronic device 10.

The lens waterproof region 310 may be made of an elastic material (e.g., rubber) and may serve to protect the camera lens 211 from an external impact and to primarily block the penetration of fluid into the inside of the electronic device 10. In addition, the filter waterproof region 330 may be made of an elastic material (e.g., rubber) and may serve to protect the filter barrel 220 from an external impact and to secondarily and tertiarily block the penetration of fluid into the inside of the electronic device 10.

In operation 1303, the barrel structure 200 inserted into the camera housing structure 300 may be seated on the seating portion 510 of the third part 500, which extends from the bezel 150 of the electronic device 10.

The third part 500 extends from the bezel 150 of the electronic device 10 and may include at least one seating portion so that the barrel structure 200, the camera housing structure 300, and the support member 400 can be seated. The seating portion in the third part 500 may include at least one seating portion 510 on which the camera housing structure 300 or the camera device 40 is seated and supported. The third part 500 may also include at least one fixing portion 530 configured to fix the support member 400.

At least a portion of the camera housing structure 300 and the barrel structure 200 may be seated on the seating part 510 of the third part 500 so as to improve the waterproof/dustproof performance of the camera device 40.

For example, on the first seating portion 511 of the third part 500 a lens waterproof region 310 corresponding to the front end portion of the camera housing structure 300 and a filter waterproof region 320 corresponding to the middle portion of the camera housing structure 300 are seated, and the seating portion 511 may form the first waterproof contact face 312 and the second waterproof contact face 332 with the first annular protrusion 311 and the second annular protrusion 331. In addition, on the second seating portion 513 of the third part 500, the image sensor 230 and the printed circuit board 240, which correspond to the rear end portion of the barrel structure 200 and a portion of the barrel structure 200, may be seated, so that the barrel structure 200 and the camera housing structure 300 can be stably supported.

The first waterproof contact face 312 may be formed when the first annular protrusion 311 protruding in the first direction of the electronic device 10, for example, toward the first plate 110 (see FIG. 2) and the inside of the electronic device 10 come into elastic contact with each other. According to an embodiment of the present disclosure, when the first annular protrusion 311 comes in direct contact with the grooved surface of the third part 500, overlap may be caused. Accordingly, a watertight seal, in which compression is caused, may be formed by the first waterproof contact face 312 to block the penetration of the fluid or the like from the outside.

The second waterproof contact face 332 may be formed when the second annular protrusion 331 protruding in the third direction, for example, toward a direction perpendicular to the first direction and the inside of the electronic device 10 come into elastic contact with each other. According to an embodiment of the present disclosure, when the second annular protrusion 331 comes in direct contact with a surface of the third part 500, overlap may be caused. Accordingly, a watertight seal, in which compression is caused, may be formed by the second waterproof contact face 332 to block the penetration of the fluid or the like from the outside.

In addition, the printed circuit board 240 of the camera device 40 may be connected to a connection portion 600 disposed outside the third part 500. The printed circuit board 240 may include a plurality of conductive routes connected to at least some of the plurality of conductive lines of the camera device 40. The printed circuit board 240 may electrically transit an image captured through the camera device 40 to the electronic device 10, and may connect the camera device 40 to a control unit of the electronic device 10 so that the camera device 40 can be controlled.

In operation 1309, an operation of fixing the support member 400 to the fixing portion 530 of the third part 500 while compressing the rear face of the barrel structure 200 by the support member 400 may be executed.

According to an embodiment of the present disclosure, operation 1309 of fixing the support member 400 may be performed as an operation in which the protrusion 410 disposed on one side of the support member 400 is inserted into the first fixing portion 531 of the third part 500, and an operation in which the corners of the other side of the support portion 400 are coupled to the second fixing portion 533.

The fixing portion 530 of the third part 500 is formed inside the electronic device 10 and may be configured with at least one groove or step such that at least a portion of the support member 400 can be inserted into the fixing portion 530. In addition, the fixing portion 530 may include a first fixing portion 531 and a second fixing portion 533.

The first fixing portion 531 may be formed inside the bezel 150 so that the protrusion 410 of the support member 400 can be inserted into the groove, thereby preventing the detachment of the camera housing structure 300 or the camera device 40. The first fixing portion 531 may be designed to form a groove to correspond to the shape of the protrusion 410 of the support member 400.

The second fixing portion 533 may be disposed opposite the first fixing portion 531 and may fix the corners disposed opposite the protrusion 410 of the supporting member 400 so that the detachment of the camera housing structure 300 or the camera device 40 can be prevented. There may be provided a plurality of second fixing portions 533 in order to block the movement of the support member 400.

According to the present disclosure, the second fixing portions 533 are configured in a stepped shape such that one corner of the support member 400 can be fitted thereto. Without being limited thereto, however, the second fixing portions 533 may be implemented in various shapes capable of fixing the support member 400.

It is necessary to compress the support member 400 inward to couple the support member with the fixing portion 530, and the compression allows the camera housing structure 300 to be more compact, so that the waterproof/dust proof features of the present disclosure can be improved.

In a conventional electronic device, a separate fixing member for fixing the support member is required. This acts as a main cause of deterioration of RF performance. In addition, this conventional design takes up considerable space inside the electronic device.

However, in the present disclosure, since the support member 400 cooperates with the third part 500 so as to minimize the space occupied by the support member 400 and eliminate the need for a separate fixing element, RF performance is improved.

Descriptions will be made based on an electronic device 10 within a network environment 1800 in various embodiments with reference to FIG. 14. The electronic device 10 may include a bus 1810, a processor 1820, a memory 1830, an input/output interface 1850, a display 30, and a communication interface 1870. In a certain embodiment, at least one of the above-mentioned components may be omitted from the electronic device 10 or the electronic device 10 may additionally include other components.

The bus 1810 may include, for example, a circuit that interconnects the above-mentioned components 1810 to 1870 and transmits communication (e.g., a control message and/or data) between the components.

The processor 1820 may include one or more of a Central Processing Unit (CPU), an Application Processor (AP), and a Communication Processor (CP). The processor 1820 may execute, for example, an arithmetic operation or data processing that is related to control and/or communication of one or more other components of the electronic device 10.

The memory 1830 may include a volatile memory and/or a non-volatile memory. The memory 1830 may store, for example, commands or data that are related to one or more other components of the electronic device 10. According to one embodiment, the memory 1830 may store software and/or a program 1840. The program 1840 may include, for example, a kernel 1841, a middleware 1843, an Application Programming Interface (API) 1845, and/or an application program (or an "application") 1847. At least one of the kernel 1841, the middleware 1843, and the API 1845 may be referred to as an Operating System (OS).

The kernel 1841 may control or manage system resources (e.g., the bus 1810, the processor 1820, or the memory 1830) that are used for executing operations or functions implemented in the other programs (e.g., the middleware 1843, the API 1845, or the application programs 1847). In addition, the kernel 1841 may provide an interface that allows the middleware 1843, the API 1845, or the application programs 1847 to access individual components of the electronic device 10 so as to control or manage the system resources.

The middleware 1843 may play an intermediary role such that, for example, the API 1845 or the application programs 1847 may communicate with the kernel 1841 so as to exchange data.

In addition, the middleware 1843 may process one or more task requests which are received from the application programs 1847, according to priority. For example, the middleware 1843 may assign the priority to be capable of using a system resource of the electronic device 10 (e.g., the bus 1810, the processor 1820, or the memory 1830) to at least one of the application programs 1847. For example, the middleware 1843 may perform scheduling, load balancing, or the like for the one or more task requests by processing the one or more requests according to the assigned priority.

The API 1845 is, for example, an interface that allows the applications 1847 to control functions provided from the kernel 1841 or the middleware 1843, and may include, for example, one or more interfaces or functions (e.g., commands) for a file control, a window control, an image processing, or a character control.

The input/output interface 1850 may serve as an interface to transmit commands or data entered by, for example, a user or any other external device to the other component(s) of the electronic device 10. Also, the input/output interface 1850 may output commands or data, which are received from the other component(s) of the electronic device 10, to the user or the other external device.

The display 30 may include, for example, a Liquid Crystal Display (LCD), a Light-Emitting Diode (LED) display, an Organic Light-Emitting Diode (OLED) display, or a Micro-ElectroMechanical System (MEMS) display, or an electronic paper display. The display 30 may display various contents (e.g., text, image, video, icon, or symbol) to, for example, the user. The display 30 may include a touch screen, and may receive a touch input, a gesture input, a proximity input, or a hovering input that is made using, for example, an electronic pen or a part of the user's body.

The communication interface 1850 may set, for example, communication between the electronic device 10 and an external device (e.g., a first external electronic device 12, a second external device 14, or a server 1806). For example, the communication interface 1870 may be connected with a network 1862 through wired or wireless communication so as to communicate with the external device (e.g., the second external electronic device 14 or the server 1806).

The wireless communication may use at least one of, for example, Long-Term Evolution (LTE), LTE Advanced (LTE-A), Code Division Multiple Access (CDMA), Wideband CDMA (WCDMA), Universal Mobile Telecommunication System (UMTS), Wireless Broadband (WiBro), or Global System for Mobile communication (GSM), as a cellular communication protocol. In addition, the wireless communication may include, for example, short-range communication 1864. The short-range communication 1864 may include at least one of, for example, Wireless Fidelity (WiFi), Bluetooth, Near Field Communication (NFC), and Global Navigation Satellite System (GNSS). The GNSS may include, for example, at least one of Global Positioning System (GPS), Global navigation satellite system (Glonass), Beidou navigation satellite system (hereinafter, "Beidou"), Galileo, and the European global satellite-based navigation system, according to, for example, a usage area or band width. Hereinafter, "GPS" and "GNSS" may be interchangeably used. The wired communication may use at least one of, for example, Universal Serial Bus (USB), High Definition Multimedia Interface (HDMI), Recommended Standard 232 (RS-232), and Plain Old Telephone Service (POTS). The network 162 may include a telecommunication network, for example, at least one of a computer network (e.g., LAN or WAN), the internet, and a telephone network.

Each of the first and second external electronic devices 12 and 14 may be of a type that is the same as or different from the electronic device 10. According to one embodiment, the server 1806 may include a group of one or more servers. According to various embodiments, all or some of the operations to be executed by the electronic device 10 may be executed in another electronic device or a plurality of other electronic devices (e.g., the electronic devices 12 and 14 or the server 1806). According to one embodiment, in the case where the electronic device 10 should perform a certain function or service automatically or upon request, the electronic device 10 may request some functions or services that are associated therewith from the other electronic devices (e.g., the electronic devices 12 and 14 or the server 1806), instead of, or in addition to, executing the functions or service by itself. The other electronic devices (e.g., the electronic devices 12 and 14 or the server 1806) may execute the requested functions or additional functions, and may deliver the results to the electronic device 10. The electronic device 10 may provide the requested functions or services by processing the received results as they are or additionally. For this purpose, for example, a cloud computing technique, a distributed computing technique, or a client-server computing technique may be used.

The electronic device 10 to be described below may be formed of any one of the above-mentioned wearable device, a notebook computer, a notebook computer, a smart phone, a tablet PC, Galaxy Tab, I-Pad, and a wireless charging device. In the present embodiment, the electronic device 10 may be formed as a smart phone.

The wireless charging device according to various embodiments of the present disclosure is a device that wirelessly transmits/receives power within a short distance so as to charge the electronic device.

In addition, in the electronic device, a bezel region may be minimized to implement a luxurious design while somewhat increasing the size of the display unit of the electronic device, or a flexible display unit may be provided in order to implement a convex or concave display unit.

That is, a peripheral portion of the display unit may be bent, and a screen area may be provided to be used in a state where the screen area is enlarged to a side face portion of the display unit. As a viewing area of the display unit is bent and provided to the side face portion thereof, it is possible to use the viewing area in an enlarged state, or to use a separate screen on the side face portion, and it is also possible to implement a luxurious design. In other words, the display unit may include a first viewing area, and second viewing areas provided on the opposite sides of the first screen area.

Figure 15:
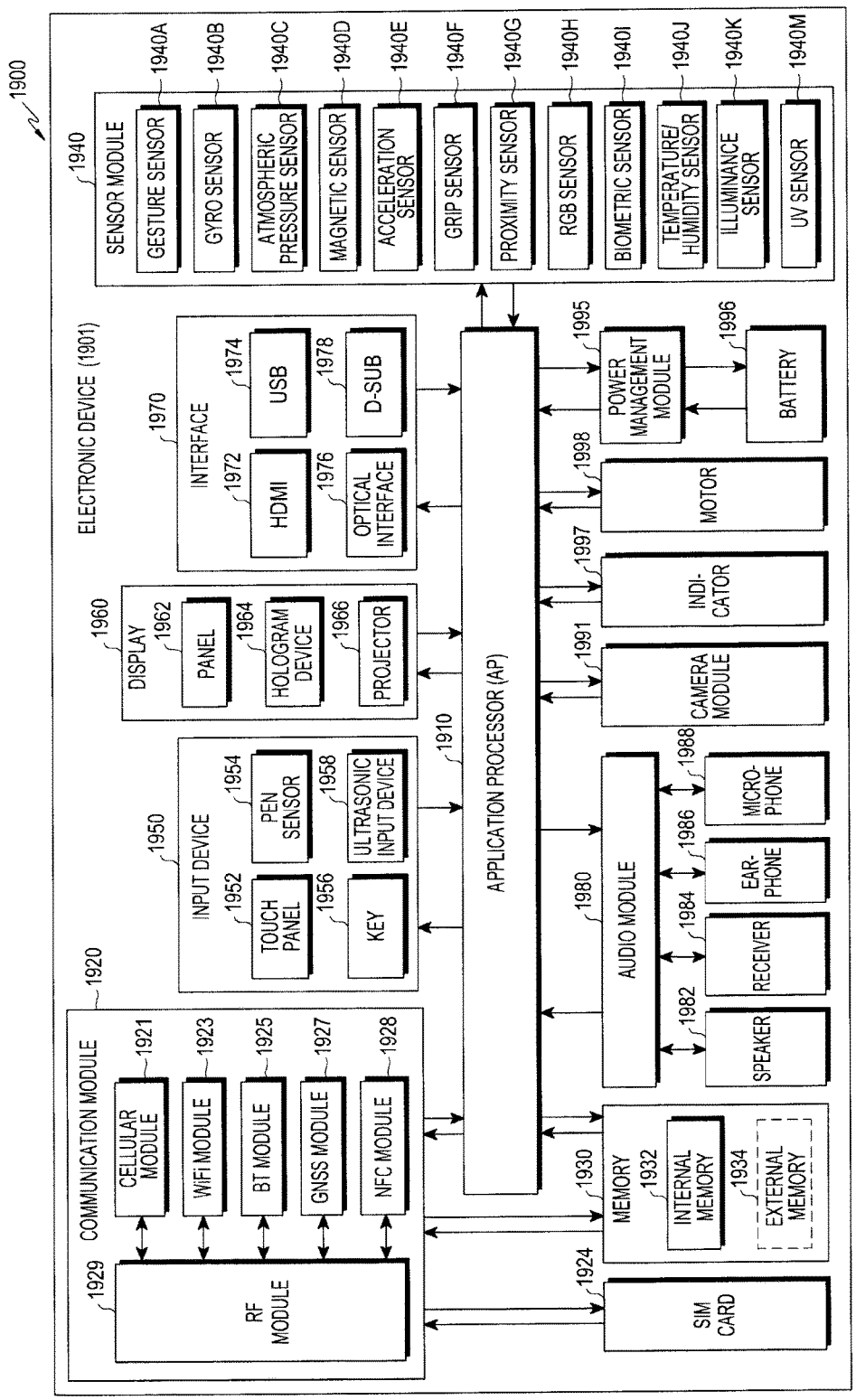
FIG. 15 is a block diagram illustrating a detailed configuration of an electronic device according to an embodiment of the present disclosure.

FIG. 15 is a block diagram of an electronic device 1901 according to various embodiments. The electronic device 1901 may include, for example, the whole or a portion of the electronic device 10 illustrated in FIG. 1. The electronic device 1901 may include at least one processor (e.g., an Application Processor (AP)) 1910, a communication module 1920, a subscriber identification module 1924, a memory 1930, a sensor module 1940, an input device 1950, a display 1960, an interface 1970, an audio module 1980, a camera module 1991, a power management module 1995, a battery 1996, an indicator 1997, and a motor 1998.

The processor 1910 may drive, for example, an operating system or an application program so as to control a plurality of hardware or software components connected thereto, and may also perform various data processing and arithmetic operations. The processor 1910 may be implemented by, for example, a System-on-Chip (SoC). According to one embodiment, the processor 1910 may further include a Graphic Processing Unit (GPU) and/or an image signal processor. The processor 1910 may include at least some components (e.g., a cellular module 1921) among the components illustrated in FIG. 19. The processor 1910 may load a command or data received from at least one of the other components (e.g., a non-volatile memory) in a volatile memory to process the command and data, and may store various data in a non-volatile memory.

Figure 14:
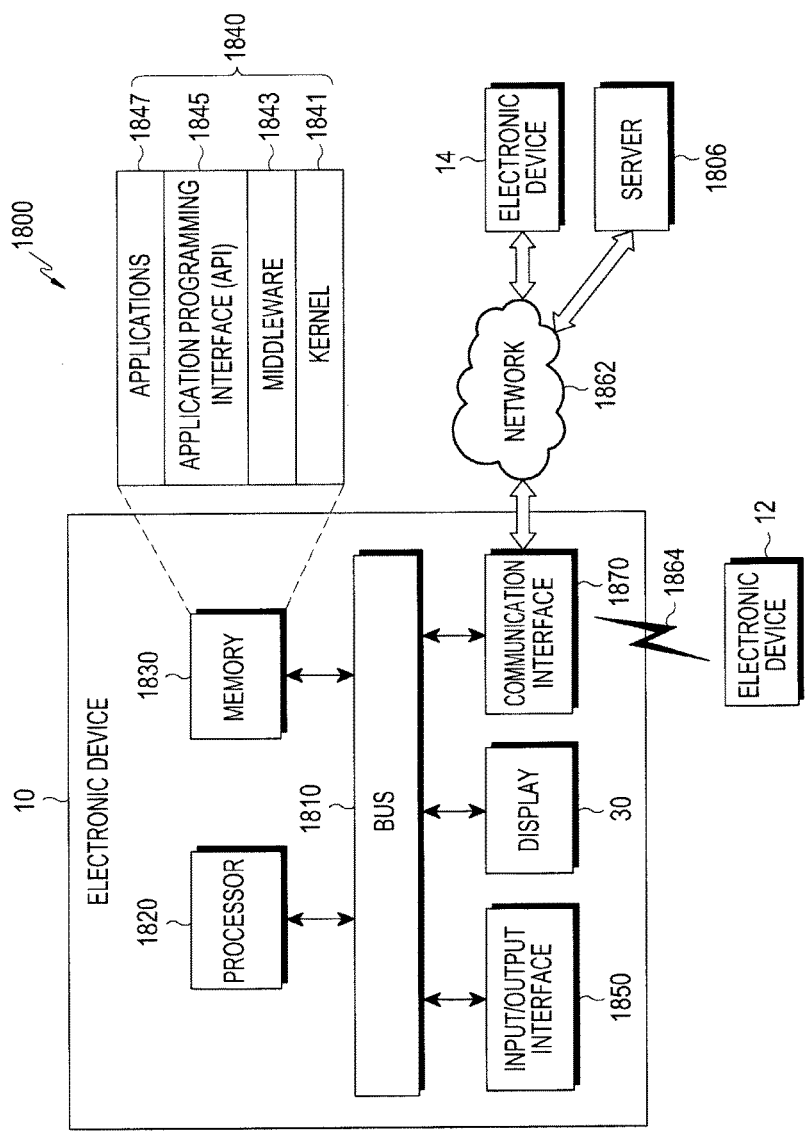
FIG. 14 is a block diagram illustrating a network environment of an electronic device according to an embodiment of the present disclosure.

The communication module 1920 may have a configuration that is the same as or similar to the communication interface 1850 of FIG. 14. The communication module 1920 may include, for example, a cellular module 1921, a WiFi module 1923, a Bluetooth module 1925, a GNSS module 1927 (e.g., GPS module, Glonass module, Beidou module, or Galileo module), an NFC module 1928, and a Radio Frequency (RF) module 1929.

The cellular module 1921 may provide, for example, a voice call, a video call, a message service, or an internet service through a communication network. According to one embodiment, the cellular module 1921 may perform discrimination and authentication of the electronic device 1901 within the communication network using the subscriber identification module (e.g., a SIM card) 1924. According to one embodiment, the cellular module 1921 may perform at least some of the multimedia control functions that may be provided by the processor 1910. According to one embodiment, the cellular module 1921 may include a Communication Processor (CP).

Each of the WiFi module 1923, the Bluetooth module 1925, the GNSS module 1927, and the NFC module 1928 may include, for example, a processor to process data transmitted/received through a corresponding module. According to a certain embodiment, at least some (e.g., two or more) of the cellular module 1921, the WiFi module 1923, the Bluetooth module 1925, the GNSS module 1927, and the NFC module 1928 may be incorporated in a single Integrated Chip (IC) or an IC package.

The RF module 1929 may transmit/receive a communication signal (e.g., an RF signal). The RF module 1929 may include, for example, a transceiver, a Power Amp Module (PAM), a frequency filter, a Low Noise Amplifier (LNA), or an antenna. According to another embodiment, at least one of the cellular module 1921, the WiFi module 1923, the Bluetooth module 1925, the GNSS module 1927, and the NFC module 1928 may transmit/receive an RF signal through one or more separate RF modules.

The subscriber identification module 1924 may include, for example, a card that includes a subscriber identification module and/or an embedded SIM, and may also include intrinsic identification information (e.g., an Integrated Circuit Card IDentifier (ICCID)) or subscriber information (e.g., an International Mobile Subscriber Identity (IMSI)).

The memory 1930 may include, for example, an internal memory 1932 or an external memory 1934. The internal memory 1932 may include at least one of, for example, a volatile memory (e.g., Dynamic RAM (DRAM), Static RAM (SRAM), or Synchronous DRAM (SDRAM)), a non-volatile memory (e.g., One a Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., NAND flash memory, or NOR flash memory), a hard drive, or a Solid State Drive (SSD)).

The external memory 1934 may further include a flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 1934 may be functionally and/or physically connected to the electronic device 1901 through various interfaces.

For example, the sensor module 1940 may measure a physical quantity or may sense an operating status of the electronic device 1901, and may then convert the measured or sensed information into electric signals. The sensor module 1940 may include at least one of, for example, a gesture sensor 1940A, a gyro sensor 1940B, an atmospheric pressure sensor 1940C, a magnetic sensor 1940D, an acceleration sensor 1940E, a grip sensor 1940F, a proximity sensor 1940G, a color sensor 1940H (e.g., RGB (Red, Green, Blue) sensor), a biometric sensor 1940I, a temperature/humidity sensor 1940J, an illuminance sensor 1940K, and an Ultra-Violet (UV) sensor 1940M. Additionally or alternatively, the sensor module 1940 may include, for example, an E-nose sensor, an ElectroMyoGraphy (EMG) sensor (not illustrated), an ElectroEncephaloGram (EEG) sensor, an ElectroCardioGram (ECG) sensor, an Infra-Red (IR) sensor, an iris sensor, and/or a fingerprint sensor. The sensor module 1940 may further include a control circuit for controlling one or more sensors incorporated therein. In a certain embodiment, the electronic device 1901 may further include a processor configured to control the sensor module 1940 as a part of the processor 1910 or separate from the processor 1910 so as to control the sensor module 1940 while the processor 1910 is in a sleep state.

The input device 1950 may include a touch panel 1952, a (digital) pen sensor 1954, a key 1956, or an ultrasonic input device 1958. As the touch panel 1952, at least one of, for example, a capacitive type touch panel, a resistive type touch panel, an infrared type touch panel, and an ultrasonic type panel may be used. Also, the touch panel 1952 may further include a control circuit. The touch panel 1952 may further include a tactile layer so as to provide a tactile reaction to the user.

The (digital) pen sensor 1954 may be, for example, a portion of the touch panel, or may include a separate recognition sheet. The key 1956 may include, for example, a physical button, an optical key, or a keypad. The ultrasonic input device 1958 may sense, through a microphone (e.g., a microphone 1988), ultrasonic waves generated by an input tool so as to confirm data corresponding to the sensed ultrasonic waves.

The display 1960 may include a panel 1962, a hologram device 1964, or a projector 1966. The panel 1962 may include a configuration that is the same as or similar to that of the display of FIG. 1. The panel 1962 may be implemented to be, for example, flexible, transparent, or wearable. The panel 1962 may be configured as a single module with the touch panel 1952. The hologram device 1964 may show a stereoscopic image in the air using the interference of light. The projector 1966 may project light onto a screen so as to display an image. The screen may be located, for example, inside or outside the electronic device 1901. According to one embodiment, the display 1960 may further include a control circuit to control the panel 1962, the hologram device 1964, or the projector 1966.

The interface 1970 may include, for example, a High-Definition Multimedia Interface (HDMI) 1972, a Universal Serial Bus (USB) 1974, an optical interface 1976, or a D-subminiature (D-sub) 1978. For example, the interface 1970 may be included in the communication interface 1870 illustrated in FIG. 3. Additionally or alternatively, the interface 1970 may include, for example, a Mobile High-definition Link (MHL) interface, a Secure Digital (SD) card/Multi-Media Card (MMC) interface, or an Infrared Data Association (IrDA) standard interface.

The audio module 1980 may bi-directionally convert, for example, sound and electric signals. At least some of the components of the audio module 1980 may be included in, for example, the input/output interface 1850 illustrated in FIG. 1. The audio module 1980 may process sound information input or output through, for example, a speaker 1982, a receiver 1984, an earphone 1986, or a microphone 1988.

The camera module 1991 is a device that is capable of photographing, for example, a still image and a video image, and according to one embodiment, the camera module 2910 may include at least one image sensor (e.g., a front sensor or a rear sensor), a lens, an Image Signal Processor (ISP), or a flash (e.g., LED or xenon lamp).

The power management module 1995 may manage, for example, the electric power of the electronic device 1901. According to one embodiment, the power management module 1995 may include a Power Management Integrated Circuit (PMIC), a charger Integrated Circuit (IC), or a battery or fuel gauge. The PMIC may be configured as a wired and/or wireless charge type. The wireless charging type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the remaining capacity of the battery 1996, and a voltage, a current, or a temperature during the charge. The battery 1996 may include, for example, a rechargeable battery and/or a solar battery.

The indicator 1997 may indicate a specific status (e.g., a booting status, a message status, or a charged status) of the electronic device 1901 or of a part thereof (e.g., AP 1910). The motor 1998 may convert an electric signal into a mechanical vibration, and may generate, for example, a vibration or a haptic effect. Although not illustrated, the electronic device 1901 may include a processor (e.g., a GPU) to support a mobile TV. The processor to support a mobile TV may process media data according to the standards of, for example, Digital Multimedia Broadcasting (DMB), Digital Video Broadcasting (DVB), or MediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 16:
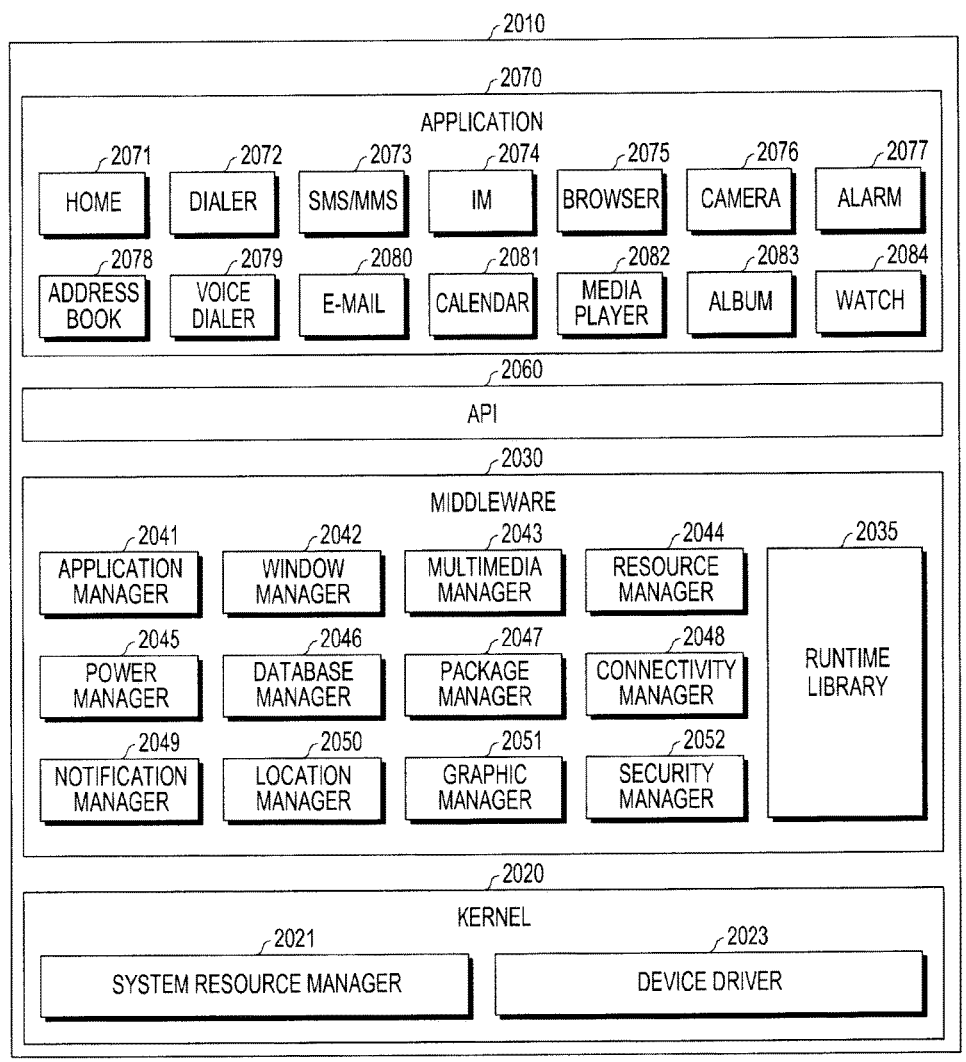
FIG. 16 is a block diagram of a program module illustrating a detailed configuration of an electronic device according to an embodiment of the present disclosure.

FIG. 16 is a block diagram illustrating a program module according to various embodiments. According to one embodiment, a program module 2010 (e.g., the program 140) may include an Operating System (OS) that controls resources associated with an electronic device (e.g., the electronic device 10) and/or various applications (e.g., the application program 147) that are driven on the operating system. The operating system may be, for example, Android, iOS, Windows, Symbian, Tizen, or Bada.

The program module 2010 may include a kernel 2020, a middleware 2030, an Application Programming Interface (API) 2060, and/or an application 2070. At least a part of the program module 2010 may be preloaded on the electronic device, or may be downloaded from an external electronic device (e.g., the device 102 or 104, or the server 106).

The kernel 2020 (e.g., the kernel 1841) may include, for example, a system resource manager 2021 and/or a device driver 2023. The system resource manager 2021 may perform, for example, a control, allocation, or recovery of a system resource. According to one embodiment, the system resource manager 2021 may include, for example, a process management unit, a memory management unit, or a file system management unit. The device driver 2023 may include, for example, a display driver, a camera driver, a Bluetooth driver, a common memory driver, a USB driver, a keypad driver, a WiFi driver, an audio driver, or an Inter-Process Communication (IPC) driver.

The middleware 2030 may provide, for example, a function that is commonly required by the applications 2070, or may provide various functions to the applications 2070 through the API 2060 such that the applications 2070 can efficiently use the limited system resources within the electronic device. According to one embodiment, the middleware 2030 (e.g., the middleware 143) may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, and a security manager 2052.

The runtime library 2035 may include, for example, a library module that is used by a compiler in order to add a new function through a program language while the applications 2070 are executed. The runtime library 2035 may perform, for example, input/output management, memory management, or an arithmetic function.

The application manager 2041 may manage, for example, a life cycle of at least one application among the applications 2070. The window manager 2042 may manage a GUI resource that is used in a screen. The multimedia manager 2043 may grasp a format required for reproducing various media files, and may perform encoding or decoding of the media files using a codec that is suitable for the corresponding format. The resource manager 2044 may manage a resource, such as a source code, a memory, or a storage space, of at least one application among the applications 2070.

The power manager 2045 is operated together with, for example, a Basic Input/Output System (BIOS) so as to manage a battery or a power source, and may provide, for example, power information that is required to operate the electronic device. The database manager 2046 may generate, retrieve, or change a database to be used by at least one application among the applications 2070. The package manager 2047 may manage the installation or update of an application that is distributed in the form of a package file.

The connectivity manager 2048 may manage, for example, a wireless connection of WiFi, Bluetooth, or the like. The notification manager 2049 may display or notify events, such as an arrival message, appointment, and proximity notification in a manner that does not disturb the user. The location manager 2050 may manage position information of the electronic device. The graphic manager 2051 may manage a graphic effect to be provided to the user or a user interface associated therewith. The security manager 2052 may provide all security functions required for, for example, system security, or user authentication. According to one embodiment, in the case where the electronic device (e.g., the electronic device 10) includes a phone function, the middleware 2030 may include a telephony manager to manage a voice or video call function of the electronic device.

The middleware 2030 may include a middleware module that forms a combination of various functions of the above-described components. The middleware 2030 may provide a module that is specialized for each kind of operating system in order to provide differentiated functions. In addition, the middleware 2030 may dynamically delete some of the existing components or add new components.

The API 2060 (e.g., the API 185) is, for example, a collection of API programming functions, and may be provided in different configurations depending on operating system. For example, Android or iOS may provide one API set for each platform and Tizen may provide two or more API sets for each platform.

The applications 2070 (e.g., an application program) may include, for example, one or more applications that can execute, for example, the functions of home 2071, a dialer 2072, SMS/MMS 2073, Instant Message (IM) 2074, a browser 2075, a camera 2076, an alarm 2077, an address book 2078, a voice dialer 2079, e-mail 2080, a calendar 2081, a media player 2082, an album 2083, and a watch 2084, health care (e.g., measurement of a quantity of motion, or blood sugar), or the provision of environmental information (e.g., provision of atmospheric pressure, humidity, or temperature information).

According to one embodiment, the applications 2070 may include an application that supports information exchange between the electronic device (e.g., the electronic device 10) and the external electronic devices (e.g., the electronic devices 12 and 14) (hereinafter, the application will be referred to as an "information exchange application" for the convenience of description). The information exchange application may include, for example, a notification relay application to transmit specific information to the external electronic devices, or a device management application to manage the external electronic devices.

For example, the notification relay application may include a function of relaying notification information generated from any other application of the electronic device (e.g., an SMS/MMS application, an e-mail application, a healthcare application, or an environment information application) to the external electronic devices (e.g., the electronic devices 12 and 14). In addition, the notification relay application may receive notification information from, for example, an external electronic device, and may provide the notification information to the user.

The device management application may manage (e.g., install, delete, or update) at least one function of an external electronic device (e.g., the electronic device 12 or 14) that communicates with the electronic device (e.g., turn-on/turn-off of the external electronic device itself (or some components thereof) or adjustment of brightness (or resolution) of a display), an application operated in the external electronic device, or a service provided by the external electronic device (e.g., a telephony service or a message service).

According to one embodiment, the applications 2070 may include an application designated according to an attribute of an external electronic device (e.g., the electronic device 12 or 14) (e.g., a healthcare application of a mobile medical device). According to one embodiment, the applications 2070 may include an application received from an external electronic device (e.g., the server 1806 or the electronic device 12 or 14). According to one embodiment, the applications 2070 may include a preloaded application or a third party application that is capable of being downloaded from the server. The names of the components of the program module 2010 according to the illustrated embodiment may vary depending on the kind of operating system.

According to various embodiments, at least a portion of the program module 2010 may be implemented as software, firmware, hardware, or a combination of two or more thereof. At least a portion of the program module 2010 may be implemented (e.g., executed) by, for example, a processor (e.g., the processor 1820). At least a portion of the program module 2010 may include, for example, a module, a program, a routine, a set of instructions, or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 1820), may cause the one or more processors to execute the function corresponding to the instruction. The computer-readable storage medium may be, for example, the memory 1830.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various embodiments of the present disclosure, an electronic device may include: a housing including a substantially transparent plate that includes a first surface facing in a first direction, and a second surface facing in a second direction opposite from the first direction; a display exposed in the first direction through a first part of the plate; and a camera device exposed in the first direction through a second part of the plate. The camera device may include: a barrel structure including a side wall defining a space therein, and an opening facing the first direction; one or more lenses positioned in the space in the barrel structure; an image sensor positioned such that the one or more lenses are positioned between the opening and the image sensor; and a camera housing structure including a side portion surrounding at least a portion of the side wall of the barrel structure and an upper portion facing the first direction. The camera housing structure may include a first protrusion formed on the upper portion.

According to an embodiment of the present disclosure, the first protrusion may be annular and may be formed from a same material as the camera housing structure.

According to an embodiment of the present disclosure, the first protrusion may be formed with an elastic material.

According to an embodiment of the present disclosure, the first protrusion may be formed with an elastic material.

According to an embodiment of the present disclosure, the camera housing structure may elastically wrap around the barrel structure so as to block penetration of liquids into the electronic device.

According to an embodiment of the present disclosure, the camera housing structure may include a second protrusion formed on a surface of the side portion, where the second protrusion may protrude in a third direction different from the first direction.

According to an embodiment of the present disclosure, the first protrusion may protrude in the first direction.

According to an embodiment of the present disclosure, a third part extending from a bezel may be disposed inside the electronic device, and the third part may include at least one seating portion in which the barrel structure and/or the camera housing structure is seated.

According to an embodiment of the present disclosure, the first protrusion may have a first waterproof contact face that is formed when the first protrusion comes into contact with the second surface of the plate, and the second protrusion may have a second waterproof contact face that is formed when the second protrusion comes into contact with a surface of the third part.

According to an embodiment of the present disclosure, the second protrusion may be disposed on a middle portion of the camera housing structure, and may be formed in an annular shape having a diameter larger than that of the first protrusion.

According to an embodiment of the present disclosure, an end of the camera housing structure may include a step portion extending in the third direction, the step portion may be adapted to be inserted a groove disposed inside of the electronic device so the camera housing structure is fixed within the electronic device.

According to an embodiment of the present disclosure, the electronic device may further include a support member adapted to be inserted into at least one groove in the third part to support the camera device, such that when the support member is inserted in the at least one groove, the camera device may be between the plate and the support member.

According to an embodiment of the present disclosure, the at least one groove in the third part may include at least one fixing portion that fixes the support member by compressing the support member in the first direction.

According to an embodiment of the present disclosure, the at least one seating portion may include: a first seating portion on which a front end portion of the camera housing structure are seated and which includes a first contact surface and a second contact surface for the first protrusion and the second protrusion, respectively; and a second seating portion on which a rear end portion of the camera housing structure and at least a portion of the camera device are seated.

According to an embodiment of the present disclosure, the at least one fixing portion may include: a first fixing portion formed inside the bezel of the electronic device adapted to receive a third protrusion of the support member; and a second fixing portion adapted to receive an end of the support member opposite the third protrusion, such that when the third protrusion is inserted in the first fixing portion and the opposite end is inserted in the second fixing portion, the camera housing structure may be fixed within the electronic device.

According to an embodiment of the present disclosure, the first seating portion may be connected to the second part of the plate, and the one or more lenses of the camera device may be exposed to an exterior of the electronic device through an opening in the second part of the plate.

According to an embodiment of the present disclosure, the first seating portion may include a first groove adapted to receive a lens region of the camera housing structure and a second groove adapted to receive a filter region of the camera housing structure, where a first diameter of the first groove is smaller than a second diameter of the second groove.

According to an embodiment of the present disclosure, when the support member is received in the at least one groove in the third part, the barrel structure may be compressed in the first direction According to an embodiment of the present disclosure, the second fixing portion may include at least two members each adapted to receive a corner of the support member.

According to an embodiment of the present disclosure, the support member may include an open slit formed inwardly from an edge thereof, and coupling of the support member to the second fixing portion may be guided by elastic deformation of the open slit.

According to an embodiment of the present disclosure, the support member may have a bent structure, such that when the support member is coupled to the third part, the support member exerts a compression force on the camera device.

According to an embodiment of the present disclosure, the support member may have a portion with increased thickness, such that when the support member is coupled to the third part, the support member exerts a compression force on the camera device According to various embodiments of the present disclosure, there is provided a camera housing structure disposed in an electronic device adapted to receive at least a portion of a barrel structure of a camera device. The camera housing structure may include: a first hole positioned at one end of the camera housing structure and having a first size; a second hole positioned at the other end of the camera housing structure and having a size larger than the first size; at least one first annular protrusion protruding from a front end of the camera housing structure toward a first direction; and at least one second annular protrusion protruding from a middle portion of the camera housing structure in a third direction, which is different from the first direction.

According to an embodiment of the present disclosure, the second hole of the camera housing structure may provide a passage into which the barrel structure is inserted, and the first hole may be formed to expose a lens of the camera device to an exterior of the electronic device.

According to an embodiment of the present disclosure, there is provided a method of manufacturing an electronic device. The method may include: inserting at least a portion of a barrel structure of a camera device into a camera housing structure; seating the barrel structure, which is inserted into the camera housing structure on a seating portion of a part that extends from a bezel of the electronic device; and fixing a support member to a fixing portion of the part, so that when the support member is fixed to the fixing portion, the support member compresses a rear face of the seated barrel structure.

According to an embodiment of the present disclosure, the seating of the barrel structure step may include: seating a front end portion of the camera housing structure on a first seating portion of the part; and seating a rear end portion of the camera housing structure or at least a portion of the barrel structure on a second seating portion of the part.

According to an embodiment of the present disclosure, the fixing of the support member step may include: inserting a protrusion disposed on one side of the support member into a first fixing portion of the part; and coupling one or more corners of the support member on a side of the support member opposite the protrusion to a second fixing portion of the part.

According to an embodiment of the present disclosure, the method may further include connecting a printed circuit board of the camera device to a connection part of the electronic device.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. An electronic device comprising:
a housing including a substantially transparent plate, wherein the plate includes a first surface facing in a first direction, and a second surface facing in a second direction opposite from the first direction;
a display exposed in the first direction through a first part of the plate; and
a camera device exposed in the first direction through a second part of the plate,
wherein the camera device includes:
a barrel structure including a side wall defining a space therein and an opening facing the first direction;
one or more lenses positioned in the space in the barrel structure;
an image sensor positioned such that the one or more lenses are positioned between the opening and the image sensor; and
a camera housing structure including a side portion surrounding at least a portion of the side wall of the barrel structure and an upper portion facing the first direction, and
wherein the camera housing structure includes a first protrusion formed on the upper portion,
wherein the camera housing structure elastically wraps around the barrel structure so as to block penetration of liquids into the electronic device, and
wherein the camera housing structure includes a second protrusion formed on a surface of the side portion, wherein the second protrusion protrudes in a third direction different from the first direction.

2. The electronic device of claim 1, wherein the first protrusion is annular and is formed from a same material as the camera housing structure.

3. The electronic device of claim 2, wherein the first protrusion is formed with an elastic material.

4. The electronic device of claim 1, wherein the first protrusion protrudes in the first direction,
wherein the second protrusion is disposed on a middle portion of the camera housing structure, and is formed in an annular shape having a diameter larger than that of the first protrusion.

5. The electronic device of claim 4, wherein a third part extending from a bezel is disposed inside the electronic device, and the third part includes at least one seating portion in which the barrel structure and/or the camera housing structure is seated.

6. The electronic device of claim 5, wherein the first protrusion has a first waterproof contact face that is formed when the first protrusion comes into contact with the second surface of the plate, and the second protrusion has a second waterproof contact face that is formed when the second protrusion comes into contact with a surface of the third part.

7. The electronic device of claim 5, further comprising:
a support member adapted to be inserted into at least one groove in the third part to support the camera device, wherein when the support member is inserted in the at least one groove, the camera device is between the plate and the support member.

8. The electronic device of claim 7, wherein the at least one groove in the third part includes at least one fixing portion that fixes the support member by compressing the support member in the first direction,
wherein the at least one fixing portion includes: a first fixing portion formed inside the bezel of the electronic device adapted to receive a third protrusion of the support member; and a second fixing portion adapted to receive an end of the support member opposite the third protrusion, wherein when the third protrusion is inserted in the first fixing portion and the opposite end is inserted in the second fixing portion, the camera housing structure is fixed within the electronic device.

9. The electronic device of claim 8, wherein the second fixing portion comprises at least two members each adapted to receive a corner of the support member.

10. The electronic device of claim 8, wherein the support member includes an open slit formed inwardly from an edge thereof, and coupling of the support member to the second fixing portion is guided by elastic deformation of the open slit,
wherein the support member has a bent structure, such that when the support member is coupled to the third part, the support member exerts a compression force on the camera device, and
wherein the support member has a portion with increased thickness, such that when the support member is coupled to the third part, the support member exerts a compression force on the camera device.

11. The electronic device of claim 7, wherein when the support member is received in the at least one groove in the third part, the barrel structure is compressed in the first direction.

12. The electronic device of claim 5, wherein the at least one seating portion includes: a first seating portion on which a front end portion of the camera housing structure are seated and which includes a first contact surface and a second contact surface for the first protrusion and the second protrusion, respectively; and a second seating portion on which a rear end portion of the camera housing structure and at least a portion of the camera device are seated.

13. The electronic device of claim 12, wherein the first seating portion is connected to the second part of the plate, and the one or more lenses of the camera device are exposed to an exterior of the electronic device through an opening in the second part of the plate.

14. The electronic device of claim 13, wherein the first seating portion includes a first groove adapted to receive a lens region of the camera housing structure and a second groove adapted to receive a filter region of the camera housing structure, wherein a first diameter of the first groove is smaller than a second diameter of the second groove.

15. The electronic device of claim 1, wherein an end of the camera housing structure includes a step portion extending in the third direction, wherein the step portion is adapted to be inserted a groove disposed inside of the electronic device so the camera housing structure is fixed within the electronic device.

16. A camera housing structure disposed in an electronic device adapted to receive at least a portion of a barrel structure of a camera device, the camera housing structure comprising:
a first hole positioned at one end of the camera housing structure and having a first size;
a second hole positioned at the other end of the camera housing structure and having a size larger than the first size;
at least one first annular protrusion protruding from a front end of the camera housing structure toward a first direction; and
at least one second annular protrusion protruding from a middle portion of the camera housing structure in a third direction, which is different from the first direction.

17. The camera housing structure of claim 16, wherein the second hole of the camera housing structure provides a passage into which the barrel structure is inserted, and the first hole is formed to expose a lens of the camera device to an exterior of the electronic device.

18. A method of manufacturing an electronic device, the method comprising:
- inserting at least a portion of a barrel structure of a camera device into a camera housing structure;
- seating the barrel structure, which is inserted into the camera housing structure on a seating portion of a part that extends from a bezel of the electronic device;
- fixing a support member to a fixing portion of the part, so that when the support member is fixed to the fixing portion, the support member compresses a rear face of the seated barrel structure; and
- joining and connecting a printed circuit board of the camera device to a connection part of the electronic device.

\* \* \* \* \*